United States Patent
Imaki et al.

(10) Patent No.: US 11,543,524 B2
(45) Date of Patent: Jan. 3, 2023

(54) LASER RADAR DEVICE

(71) Applicant: Mitsubishi Electric Corporation, Tokyo (JP)

(72) Inventors: Masaharu Imaki, Tokyo (JP); Shumpei Kameyama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 832 days.

(21) Appl. No.: 16/471,430

(22) PCT Filed: Jan. 24, 2017

(86) PCT No.: PCT/JP2017/002282
§ 371 (c)(1),
(2) Date: Jun. 19, 2019

(87) PCT Pub. No.: WO2018/138766
PCT Pub. Date: Aug. 2, 2018

(65) Prior Publication Data
US 2020/0309950 A1  Oct. 1, 2020

(51) Int. Cl.
G01S 17/10 (2020.01)
G01S 7/48 (2006.01)
G01S 7/481 (2006.01)

(52) U.S. Cl.
CPC ............ *G01S 17/10* (2013.01); *G01S 7/4804* (2013.01); *G01S 7/4813* (2013.01); *G01S 7/4818* (2013.01)

(58) Field of Classification Search
CPC ...... G01S 17/10; G01S 7/4804; G01S 7/4813; G01S 7/4818; G01S 7/4815; G01S 7/487;
(Continued)

(56) References Cited

U.S. PATENT DOCUMENTS 8,541,744 B1    9/2013 Liu
2008/0210881 A1  9/2008 Harris et al.
(Continued)

FOREIGN PATENT DOCUMENTS

JP      11-83629 A    3/1999
JP   2009-503486 A    1/2009
(Continued)

OTHER PUBLICATIONS

Shoken Ishii, Kohei Mizutani, Hirotake Fukuoka, Takayoshi Ishikawa, Baron Philippe, Hironari Iwai, Tetsuo Aoki, Toshikazu Itabe, Atsushi Sato, and Kazuhiro Asai, "Coherent 2 µm differential absorption and wind lidar with conductively cooled laser and two-axis scanning device," (Year: 2010).*
(Continued)

*Primary Examiner* — Luke D Ratcliffe
*Assistant Examiner* — Sanjida Naser
(74) *Attorney, Agent, or Firm* — Birch, Stewart, Kolasch & Birch, LLP

(57) ABSTRACT

A frequency shift correcting unit (25) which corrects a frequency shift of a plurality of first signal spectra within the same time range with respect to a frequency of first laser light beam and corrects a frequency shift of a plurality of second signal spectra within the same time range with respect to a frequency of second laser light beam, and a spectrum integrating unit (26) which integrates a plurality of first signal spectra corrected by the frequency shift correcting unit (25) and integrates a plurality of second signal spectra corrected by the frequency shift correcting unit (25) are provided, and a molecular concentration calculating unit (27) calculates a concentration of molecules in the atmosphere from the first and second signal spectra integrated by the spectrum calculating unit (26).

12 Claims, 16 Drawing Sheets

(58) Field of Classification Search
CPC ........ G01S 7/497; G01S 17/95; G01S 7/4802; Y02A 90/10
See application file for complete search history.

(56) References Cited

U.S. PATENT DOCUMENTS

| | | |
|---|---|---|
| 2013/0088705 A1 | 4/2013 | Asahara et al. |
| 2015/0146191 A1 | 5/2015 | Kotake et al. |
| 2015/0185328 A1 | 7/2015 | Kotake et al. |

FOREIGN PATENT DOCUMENTS

| | | |
|---|---|---|
| JP | 2013-83467 A | 5/2013 |
| JP | 2015-108557 A | 6/2015 |
| WO | WO 2014/024508 A1 | 2/2014 |
| WO | WO 2014/041852 A1 | 3/2014 |

OTHER PUBLICATIONS

Beyon et al., "Resolution study of wind parameter estimates by a coherent Doppler lidar system," Proceedings of SPIE, vol. 6214, Bellingham, WA USA, May 19, 2006, XP040224329, 8 Pages.

Koch et al., "Validar: a testbed for advanced 2-micron Doppler lidar," Proceedings of SPIE vol. 5412, Bellingham, WA USA, Aug. 13, 2004, XP040184552, pp. 87-98.

International Search Report (PCT/ISA/210) issued in PCT/JP2017/002282, dated Apr. 25, 2017.

Ishii et al., "Coherent 2μm differential absorption and wind lidar with conductively cooled laser and two-axis scanning device," Applied Optics, vol. 49, No. 10, Apr. 1, 2010, pp. 1809-1817.

\* cited by examiner

LASER RADAR DEVICE

TECHNICAL FIELD

The present disclosure relates to laser radar devices for calculating a concentration of molecules in the atmosphere.

BACKGROUND ART

Non-Patent Literature 1 mentioned below discloses a laser radar device for calculating a concentration of molecules in the atmosphere.

This laser radar device includes light sources, one of which generates laser light at an absorption wavelength which is a wavelength absorbed by the molecule in the atmosphere, another of which generates laser light at a non-absorption wavelength which is a wavelength not absorbed by the molecule in the atmosphere. The molecule in the atmosphere has an inherent absorption spectrum, and the wavelength of the laser light at the absorption wavelength corresponds to an absorption spectrum wavelength of the molecule in the atmosphere.

The laser radar device also includes an optical antenna which emits the laser light of the absorption wavelength and the laser light of the non-absorption wavelength that are generated from the light source into the atmosphere, and receives scattered light of the laser light of the absorption wavelength and scattered light of the laser light of the non-absorption wavelength that are scattered by aerosol in the atmosphere.

Hereinafter, the scattered light of the laser light of the absorption wavelength is referred to as "absorption wavelength scattered light", and the scattered light of the laser light of the non-absorption wavelength is referred to as "non-absorption wavelength scattered light".

Furthermore, the laser radar device includes an optical coupler which combines the absorption wavelength scattered light received by the optical antenna and the laser light of the absorption wavelength and combines the non-absorption wavelength scattered light received by the optical antenna and the laser light of the non-absorption wavelength.

The optical coupler outputs combined light beam of the absorption wavelength scattered light and the laser light of the absorption wavelength and outputs combined light beam of the non-absorption wavelength scattered light and the laser light of the non-absorption wavelength.

Hereinafter, the combined light beam of the absorption wavelength scattered light and the laser light of the absorption wavelength is referred to as "absorption wavelength combined light beam", and the combined light beam of the non-absorption wavelength scattered light and the laser light of the non-absorption wavelength is referred to as "non-absorption wavelength combined light beam".

The laser radar device includes an optical receiver which detects the absorption wavelength combined light beam output from the optical coupler and outputs a reception signal of the absorption wavelength combined light beam, and detects the non-absorption wavelength combined light beam output from the optical coupler and outputs a reception signal of the non-absorption wavelength combined light beam.

The laser radar device includes a signal processor for calculating a concentration of molecules in the atmosphere from the reception signal of the absorption wavelength combined light beam and the reception signal of the non-absorption wavelength combined light beam that are output from the optical receiver.

When the reception signal of the absorption wavelength combined light beam is output from the optical receiver, the signal processor calculates a plurality of signal spectra of the absorption wavelength combined light beam for each time range by performing fast Fourier transform on the reception signal of the absorption wavelength combined light beam.

The signal processor integrates a plurality of signal spectra by integrating signal components of the same frequency in a plurality of signal spectra within the same time range in order to increase a signal-to-noise ratio (SN ratio).

After integrating the plurality of signal spectra, the signal processor compares signal components in the signal spectrum obtained after the integration and identifies a largest signal component among the signal components as a peak intensity of the absorption wavelength combined light beam.

When the reception signal of the non-absorption wavelength combined light beam is output from the optical receiver, the signal processor calculates a plurality of signal spectra of the non-absorption wavelength combined light beam for each time range by performing fast Fourier transform on the reception signal of the non-absorption wavelength combined light beam.

The signal processor integrates a plurality of signal spectra by integrating signal components of the same frequency in a plurality of signal spectra within the same time range in order to increase an SN ratio.

After integrating the plurality of signal spectra, the signal processor compares signal components in the signal spectrum obtained after the integration and identifies a largest signal component among the signal components as a peak intensity of the non-absorption wavelength combined light beam.

The signal processor calculates an optical depth from the peak intensity of the absorption wavelength combined light beam and the peak intensity of the non-absorption wavelength combined light beam, and calculates the concentration of the molecules in the atmosphere from the optical depth.

The optical depth is a ratio of the peak intensity of the absorption wavelength combined light beam to the peak intensity of the non-absorption wavelength combined light beam in each time range.

CITATION LIST

Non-Patent Literature

Non-Patent Literature 1: Applied Optics vol. 49 pp. 1809-1817 (2010).

SUMMARY OF INVENTION

Technical Problem

Since the conventional laser radar device is configured as described above, when there is no change in position of a scattering body (for example, aerosol or atmospheric molecule) in the atmosphere, the SN ratio is increased by integrating a plurality of signal spectra. As a result, identification accuracy of the peak intensity of the absorption wavelength combined light beam and identification accuracy of the peak intensity of the non-absorption wavelength combined light beam are improved, so that calculation accuracy of the molecular concentration is also improved.

However, in an environment in which the position of the scattering body in the atmosphere changes with change in wind speed or wind direction, a Doppler shift occurs in the scattered light of the laser light.

When the Doppler shift occurs, the peak position which is a frequency corresponding to the peak intensity changes, so that even when the signal components of the same frequency in a plurality of signal spectra are integrated, the SN ratio does not increase. As a result, the identification accuracy of the peak intensity of the absorption wavelength combined light beam and the identification accuracy of the peak intensity of the non-absorption wavelength combined light beam are deteriorated, SO that the calculation accuracy of the molecular concentration is problematically deteriorated.

One or more embodiments of the present disclosure have been made to solve the above-described problem, and an object thereof is to obtain a laser radar device capable of preventing deterioration in calculation accuracy of the molecular concentration even when the position of the scattering body in the atmosphere changes.

Solution to Problem

A laser radar device according to the present disclosure includes: a spectrum calculating unit for calculating, as signal spectra of a first combined light beam that is a combined light beam of first scattered light of a first laser light beam with a wavelength absorbed by a molecule in an atmosphere scattered by a scattering body in the atmosphere and the first laser light beam, a plurality of first signal spectra in a same time range, and calculating, as signal spectra of a second combined light beam that is a combined light beam of second scattered light of a second laser light beam with a wavelength not absorbed by the molecule scattered by the scattering body and the second laser light beam, a plurality of second signal spectra in the same time range; a frequency shift correcting unit for correcting a frequency shift of the plurality of first signal spectra with respect to a frequency of the first laser light beam and correcting a frequency shift of the plurality of second signal spectra with respect to a frequency of the second laser light beam; a spectrum integrating unit for integrating the plurality of first signal spectra corrected by the frequency shift correcting unit and integrating the plurality of second signal spectra corrected by the frequency shift correcting unit; and a molecular concentration calculating unit for calculating a concentration of molecules in the atmosphere from the first and second signal spectra integrated by the spectrum integrating unit.

Advantageous Effects of Invention

According to the laser radar device, the frequency shift correcting unit which corrects the frequency shift of a plurality of first signal spectra within the same time range with respect to the frequency of the first laser light beam and corrects the frequency shift of a plurality of second signal spectra within the same time range with respect to the frequency of the second laser light beam, and the spectrum integrating unit which integrates a plurality of first signal spectra corrected by the frequency shift correcting unit and integrates a plurality of second signal spectra corrected by the frequency shift correcting unit are provided, and the molecular concentration calculating unit is configured to calculate the concentration of the molecules in the atmosphere from the first and second signal spectra integrated by the spectrum integrating unit, an effect of preventing deterioration in calculation accuracy of the molecular concentration even when there is a change in the position of the scattering body in the atmosphere.

DESCRIPTION OF EMBODIMENTS

Embodiments of the present disclosure are hereinafter described with reference to the attached drawings to describe the present invention in more detail.

Embodiment 1

Figure 1:
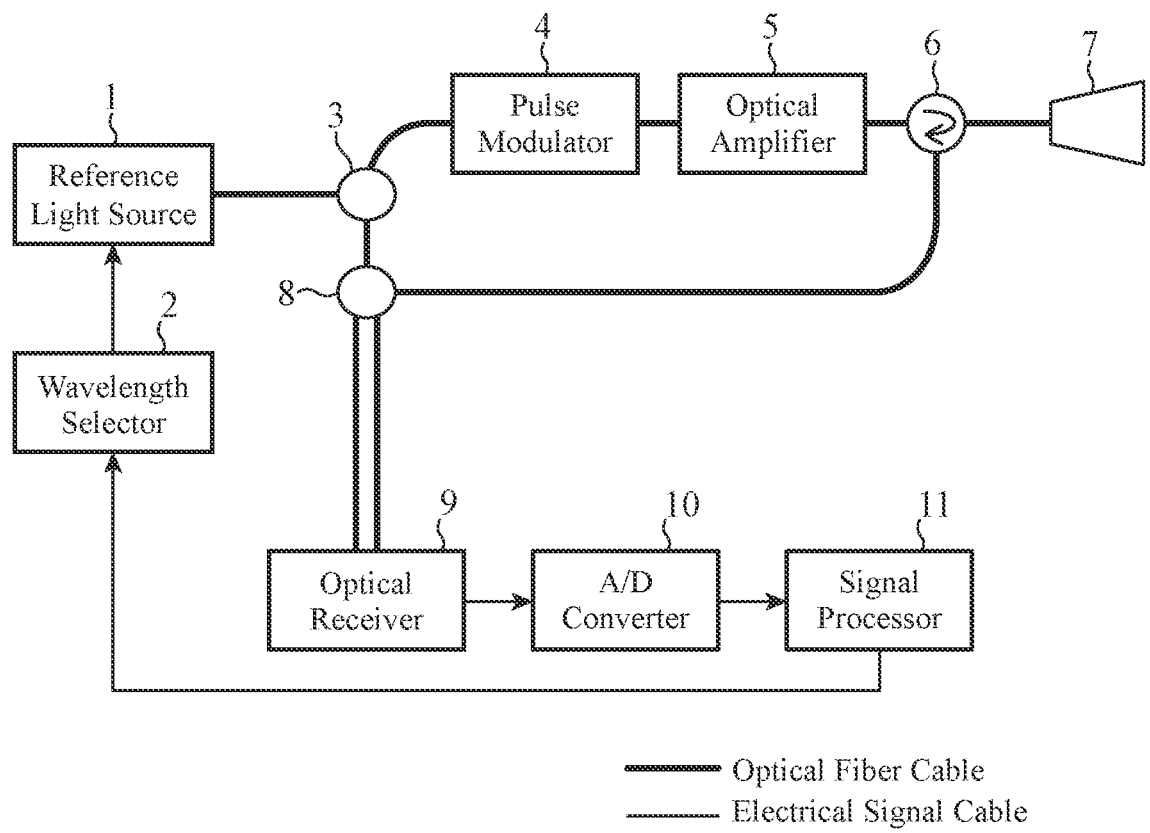
FIG. 1 is a configuration diagram illustrating a laser radar device according to Embodiment 1 of the present disclosure.

FIG. 1 is a configuration diagram illustrating a laser radar device according to Embodiment 1 of the present disclosure.

In FIG. 1, a reference light source 1 is a light source which outputs first laser light beam $Lb_1$ to an optical distributor 3 when receiving a wavelength selecting signal instructing that the first laser light beam $Lb_1$ being laser light of a wavelength absorbed by a molecule in the atmosphere be output from a wavelength selector 2.

The reference light source 1 also outputs second laser light beam $Lb_2$ to the optical distributor 3 when receiving a wavelength selecting signal instructing that the second laser light beam $Lb_2$ being laser light of a wavelength not absorbed by the molecule in the atmosphere be output from the wavelength selector 2.

The molecule in the atmosphere has an inherent absorption spectrum, and the first laser light beam $Lb_1$ being the laser light beam of the wavelength absorbed by the molecule corresponds to the absorption spectrum of the molecule in the atmosphere. Since different molecules to be observed have different absorption spectra, the wavelengths of the first laser light beam $Lb_1$ and the second laser light beam $Lb_2$ output from the reference light source 1 are set depending on the molecules to be observed.

For example, if a molecule to be observed is carbon dioxide, an absorption wavelength is set to 1572.192 nm, and a non-absorption wavelength is set to 1573.193 nm, for example.

Note that as the reference light source 1, a semiconductor laser, a fiber laser or a solid-state laser that outputs laser light with a linewidth of equal to or smaller than several MHz, or a combination of these lasers is used, for example.

In a case of outputting the first laser light beam $Lb_1$ from the reference light source 1, the wavelength selector 2 outputs the wavelength selecting signal indicating that the first laser light beam $Lb_1$ is to be output to the reference light source 1, and in a case of outputting the second laser light beam $Lb_2$ from the reference light source 1, this outputs the wavelength selecting signal indicating that the second laser light beam $Lb_2$ is to be output to the reference light source 1.

Herein, an example in which the reference light source 1 outputs the first laser light beam $Lb_1$ or the second laser light beam $Lb_2$ in accordance with the wavelength selecting signal output from the wavelength selector 2 is illustrated, but as the reference light source 1, a light source capable of simultaneously outputting the first laser light beam $Lb_1$ and the second laser light beam $Lb_2$ may also be used.

The optical distributor 3 is connected to the reference light source 1 via an optical fiber cable, and is implemented as a beam splitter, for example.

The optical distributor 3 distributes the first laser light beam $Lb_1$ and the second laser light beam $Lb_2$ output from the reference light source 1 to a pulse modulator 4 and an optical coupler 8 at a predetermined ratio.

The pulse modulator 4 is connected to the optical distributor 3 via an optical fiber cable, and is implemented as, for example, an acoustooptic device or a modulation device made of lithium niobate crystal.

The pulse modulator 4 performs pulse modulation of the first laser light beam $Lb_1$ and the second laser light beam $Lb_2$ distributed by the optical distributor 3.

An optical amplifier 5 is connected to the pulse modulator 4 via an optical fiber cable, and is implemented as, for example, an optical fiber amplifier or a waveguide type amplifier.

The optical amplifier 5 amplifies intensities of the first laser light beam $Lb_1$ and the second laser light beam $Lb_2$ output from the pulse modulator 4, and outputs the intensity-amplified first laser light beam $Lb_1$ and the intensity-amplified second laser light beam $Lb_2$ to an optical circulator 6.

The optical circulator 6 is connected to the optical amplifier 5 via an optical fiber cable, and is formed of, for example, a polarization beam splitter and a wavelength plate.

The optical circulator 6 outputs the intensity-amplified first laser light beam $Lb_1$ and the intensity-amplified second laser light beam $Lb_2$ output from the optical amplifier 5 to an optical antenna 7, and outputs first scattered light $Sb_1$ being scattered light of the first laser light beam $Lb_1$ and second scattered light $Sb_2$ being scattered light of the second laser light beam $Lb_2$ output from the optical antenna 7 to the optical coupler 8.

The optical antenna 7 is connected to the optical circulator 6 via an optical fiber cable, and includes, for example, a plurality of refracting lenses or a plurality of mirrors.

The optical antenna 7 expands beam diameters of the first laser light beam $Lb_1$ and the second laser light beam $Lb_2$ output from the optical circulator 6, and radiates the first laser light beam $Lb_1$ and the second laser light beam $Lb_2$ into the atmosphere.

Also, the optical antenna 7 receives the first scattered light $Sb_1$ being the scattered light of the first laser light beam $Lb_1$ and the second scattered light $Sb_2$ being the scattered light of the second laser light beam $Lb_2$ scattered by aerosol (scattering body) or a hard target in the atmosphere, and outputs the first scattered light $Sb_1$ and the second scattered light $Sb_2$ to the optical circulator 6.

The optical coupler 8 is connected to the optical distributor 3 and the optical circulator 6 via optical fiber cables, and is implemented as, for example, a beam splitter.

When the first scattered light $Sb_1$ is output from the optical circulator 6, the optical coupler 8 combines the first scattered light $Sb_1$ and the first laser light beam $Lb_1$ distributed by the optical distributor 3, and outputs first combined light beam $Cb_1$ being combined light beam of the first scattered light $Sb_1$ and the first laser light beam $Lb_1$ to an optical receiver 9 after branching the same into two at a ratio of 50 to 50.

When the second scattered light $Sb_2$ is output from the optical circulator 6, the optical coupler 8 combines the second scattered light $Sb_2$ and the second laser light beam $Lb_2$ distributed by the optical distributor 3, and outputs second combined light beam $Cb_2$ being combined light beam of the second scattered light $Sb_2$ and the second laser light beam $Lb_2$ to the optical receiver 9 after branching the same into two at a ratio of 50 to 50.

The optical receiver 9 is connected to the optical coupler 8 via two optical fiber cables, and is implemented as, for example, a balanced receiver which reduces common mode noise by using two photodiodes.

The optical receiver 9 performs heterodyne detection on the two first combined light beams $Cb_1$ output from the optical coupler 8, and outputs a first reception signal $R_1$ being a reception signal of the first combined light beam $Cb_1$ to an analog-digital converter (A/D converter) 10.

The optical receiver 9 also performs heterodyne detection on the two second combined light beams $Cb_2$ output from the optical coupler 8, and outputs a second reception signal $R_2$ being a reception signal of the second combined light beam $Cb_2$ to the A/D converter 10.

The first reception signal $R_1$ and the second reception signal $R_2$ are electrical signals.

The A/D converter 10 is connected to the optical receiver 9 via an electrical signal cable, converts the analog first reception signal $R_1$ and second reception signal $R_2$ output from the optical receiver 9 into digital signals, and outputs reception data $DR_1$ and $DR_2$ which are digital signals to a signal processor 11.

The signal processor 11 is connected to the A/D converter 10 via an electrical signal cable, and controls the wavelength selecting signal output from the wavelength selector 2.

The signal processor 11 also calculates a concentration C of molecules in the atmosphere on the basis of the reception data $DR_1$ and $DR_2$ output from the A/D converter 10.

Figure 2:
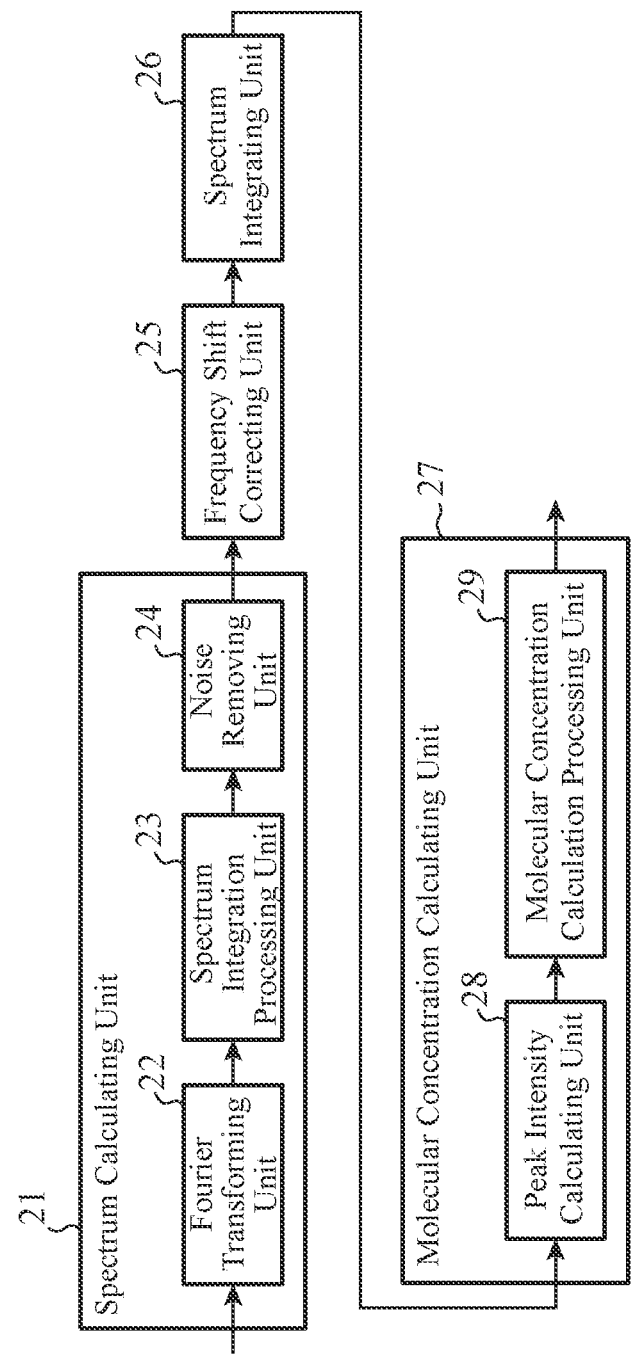
FIG. 2 is a configuration diagram illustrating a signal processor 11 of the laser radar device according to Embodiment 1 of the present disclosure.

FIG. 2 is a configuration diagram illustrating the signal processor 11 of the laser radar device according to Embodiment 1 of the present disclosure.

Figure 3:
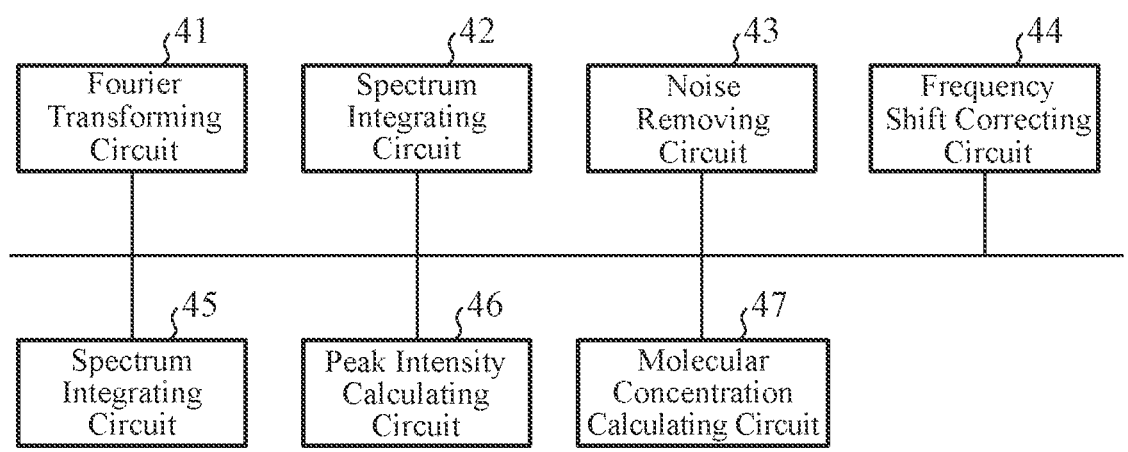
FIG. 3 is a hardware configuration diagram illustrating the signal processor 11 of the laser radar device according to Embodiment 1 of the present disclosure.

FIG. 3 is a hardware configuration diagram illustrating the signal processor 11 of the laser radar device according to Embodiment 1 of the present disclosure.

In FIGS. 2 and 3, a spectrum calculating unit 21 is provided with a Fourier transforming unit 22, a spectrum integration processing unit 23, and a noise removing unit 24.

The spectrum calculating unit 21 calculates a first signal spectrum $SP_1$ being a signal spectrum of the reception data $DR_1$ output from the A/D converter 10, and calculates a second signal spectrum $SP_2$ being a signal spectrum of the reception data $DR_2$ output from the A/D converter 10.

The Fourier transforming unit 22 is implemented by, for example, a Fourier transforming circuit 41 illustrated in FIG. 3.

The Fourier transforming unit 22 calculates a plurality of first signal spectra $SP_1$ for each time range as signals of the reception data $DR_1$ in frequency domain by carrying out a fast Fourier transforming (FFT) process on the reception data $DR_1$ output from the A/D converter 10.

The Fourier transforming unit 22 also calculates a plurality of second signal spectra $SP_2$ for each time range as signals of the reception data $DR_2$ in frequency domain by carrying out a FFT on the reception data $DR_2$ output from the A/D converter 10.

The spectrum integration processing unit 23 is implemented by, for example, a spectrum integrating circuit 42 illustrated in FIG. 3.

The spectrum integration processing unit 23 performs a process of integrating a plurality of first signal spectra $SP_1$ within the same time range calculated by the Fourier transforming unit 22 and outputting the first signal spectrum $SP_1$ after the integration to the noise removing unit 24.

The spectrum integration processing unit 23 also performs a process of integrating a plurality of second signal spectra $SP_2$ within the same time range calculated by the Fourier transforming unit 22 and outputs the second signal spectrum $SP_2$ after the integration to the noise removing unit 24.

The noise removing unit 24 is realized by, for example, a noise removing circuit 43 illustrated in FIG. 3.

The noise removing unit 24 performs a process of removing noise components included in the first signal spectrum $SP_1$ obtained by integration by the spectrum integration processing unit 23 and outputting the first signal spectrum $SP_1$ obtained by removing the noise components to a frequency shift correcting unit 25.

Also, the noise removing unit 24 performs a process of removing noise components included in the second signal spectrum $SP_2$ obtained by integration by the spectrum integration processing unit 23 and outputting the second signal spectrum $SP_2$ obtained by removing the noise components to the frequency shift correcting unit 25.

The frequency shift correcting unit 25 is implemented by a frequency shift correcting circuit 44 illustrated in FIG. 3, for example.

The frequency shift correcting unit 25 performs a process of correcting a frequency shift of the first signal spectrum $SP_1$ obtained after the noise component removal by the noise removing unit 24 with respect to the frequency of the first laser light beam $Lb_1$ emitted from the optical antenna 7.

Also, the frequency shift correcting unit 25 performs a process of correcting a frequency shift of the second signal spectrum $SP_2$ obtained after the noise component removal by the noise removing unit 24 with respect to the frequency of the second laser light beam $Lb_2$ emitted from the optical antenna 7.

A spectrum integrating unit 26 is implemented by, for example, a spectrum integrating circuit 45 illustrated in FIG. 3.

The spectrum integrating unit 26 performs a process of integrating a plurality of first signal spectra $SP_1$ frequency shifts of which are corrected by the frequency shift correcting unit 25 and outputting the integrated first signal spectrum $SP_1$ to a peak intensity calculating unit 28.

The plurality of first signal spectra $SP_1$ frequency shifts of which are corrected by the frequency shift correcting unit 25 is a plurality of corrected signal spectra obtained by integrating the plurality of signal spectra obtained at different timings within the same time range.

Note that the spectrum integrating unit 26 integrates the plurality of first signal spectra $SP_1$ by integrating signal components of the same frequency in a plurality of first signal spectra $SP_1$ frequency shifts of which are corrected by the frequency shift correcting unit 25.

The spectrum integrating unit 26 performs a process of integrating a plurality of second signal spectra $SP_2$ frequency shifts of which are corrected by the frequency shift correcting unit 25 and outputting the integrated second signal spectrum $SP_2$ to the peak intensity calculating unit 28.

The plurality of second signal spectra $SP_2$ frequency shifts of which are corrected by the frequency shift correcting unit 25 is a plurality of corrected signal spectra obtained by integrating the plurality of signal spectra obtained at different timings within the same time range.

Note that the spectrum integrating unit 26 integrates the plurality of second signal spectra $SP_2$ by integrating signal components of the same frequency in a plurality of second signal spectra $SP_2$ frequency shifts of which are corrected by the frequency shift correcting unit 25.

A molecular concentration calculating unit 27 is provided with a peak intensity calculating unit 28 and a molecular concentration calculation processing unit 29.

The molecular concentration calculating unit 27 calculates a concentration C of the molecules in the atmosphere from the first signal spectrum $SP_1$ integrated by the spectrum integrating unit 26 and the second signal spectrum $SP_2$ integrated by the spectrum integrating unit 26.

The peak intensity calculating unit 28 is implemented by, for example, a peak intensity calculating circuit 46 illustrated in FIG. 3.

The peak intensity calculating unit 28 performs a process of calculating a first peak intensity $P_{on}$ which is the peak intensity of the first signal spectrum $SP_1$ obtained by integration by the spectrum integrating unit 26.

The peak intensity calculating unit 28 also performs a process of calculating a second peak intensity $P_{off}$ which is the peak intensity of the second signal spectrum $SP_2$ obtained by integration by the spectrum integrating unit 26.

The molecular concentration calculation processing unit 29 is implemented by, for example, a molecular concentration calculating circuit 47 illustrated in FIG. 3.

The molecular concentration calculation processing unit 29 performs a process of calculating the concentration C of the molecules in the atmosphere from the first peak intensity $P_{on}$ calculated by the peak intensity calculating unit 28 and the second peak intensity $P_{off}$ calculated by the peak intensity calculating unit 28.

In FIG. 2, it is assumed that each of the Fourier transforming unit 22, the spectrum integration processing unit 23, the noise removing unit 24, the frequency shift correcting unit 25, the spectrum integrating unit 26, the peak intensity calculating unit 28, and the molecular concentration calculation processing unit 29 which are components of the signal processor 11 is implemented by dedicated hardware as illustrated in FIG. 3. Specifically, the signal processor 11 is assumed to be implemented by the Fourier transforming circuit 41, the spectrum integrating circuit 42, the noise removing circuit 43, the frequency shift correcting circuit 44, the spectrum integrating circuit 45, the peak intensity calculating circuit 46, and the molecular concentration calculating circuit 47.

Each of the Fourier transforming circuit 41, the spectrum integrating circuit 42, the noise removing circuit 43, the frequency shift correcting circuit 44, the spectrum integrating circuit 45, the peak intensity calculating circuit 46, and the molecular concentration calculating circuit 47 corresponds to, for example, a single circuit, a composite circuit, a programmed processor, a parallel-programmed processor, an application specific integrated circuit (ASIC), a field-programmable gate array (FPGA), or a combination thereof.

However, the components of the signal processor 11 are not limited to those implemented by the dedicated hardware, and the signal processor 11 may also be implemented by software, firmware, or a combination of the software and firmware.

The software or firmware is stored as a program in a memory of a computer. The computer is intended to mean the hardware which executes the program, and corresponds to, for example, a central processing unit (CPU), a central processor, a processing unit, an arithmetic unit, a microprocessor, a microcomputer, a processor, a digital signal processor (DSP) and the like.

The memory of the computer corresponds to, for example, a non-volatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, an optical disc, a compact disc, a mini disc, a digital versatile disc (DVD) and the like.

Figure 4:
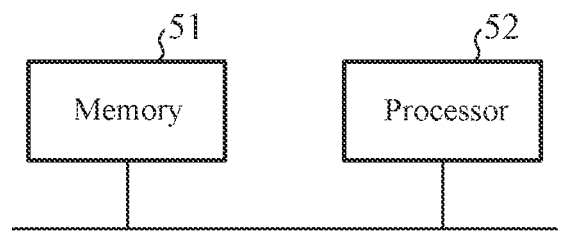
FIG. 4 is a hardware configuration diagram of a computer when the signal processor 11 is implemented as software or firmware.

FIG. 4 is a hardware configuration diagram of a computer for a case in which the signal processor 11 is implemented by using software or firmware.

In the case in which the signal processor 11 is implemented by using software or firmware, the program for allowing the computer to execute procedures of the Fourier transforming unit 22, the spectrum integration processing unit 23, the noise removing unit 24, the frequency shift correcting unit 25, the spectrum integrating unit 26, the peak intensity calculating unit 28, and the molecular concentration calculation processing unit 29 may be stored in a memory 51 and a processor 52 of the computer may execute the program stored in the memory 51.

Figure 5:
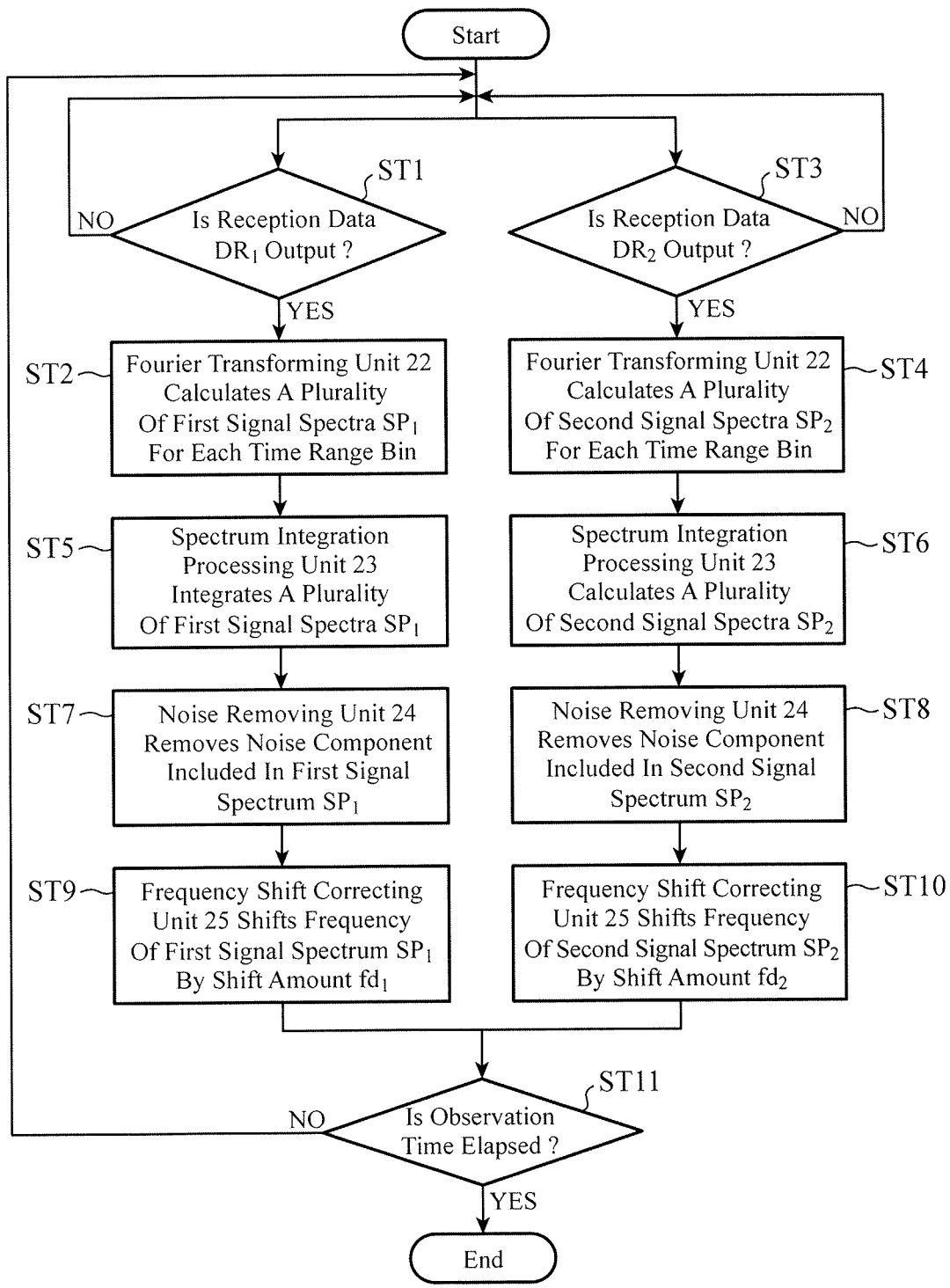
FIG. 5 is a flowchart illustrating a procedure when the signal processor 11 is implemented as software or firmware.
Figure 6:
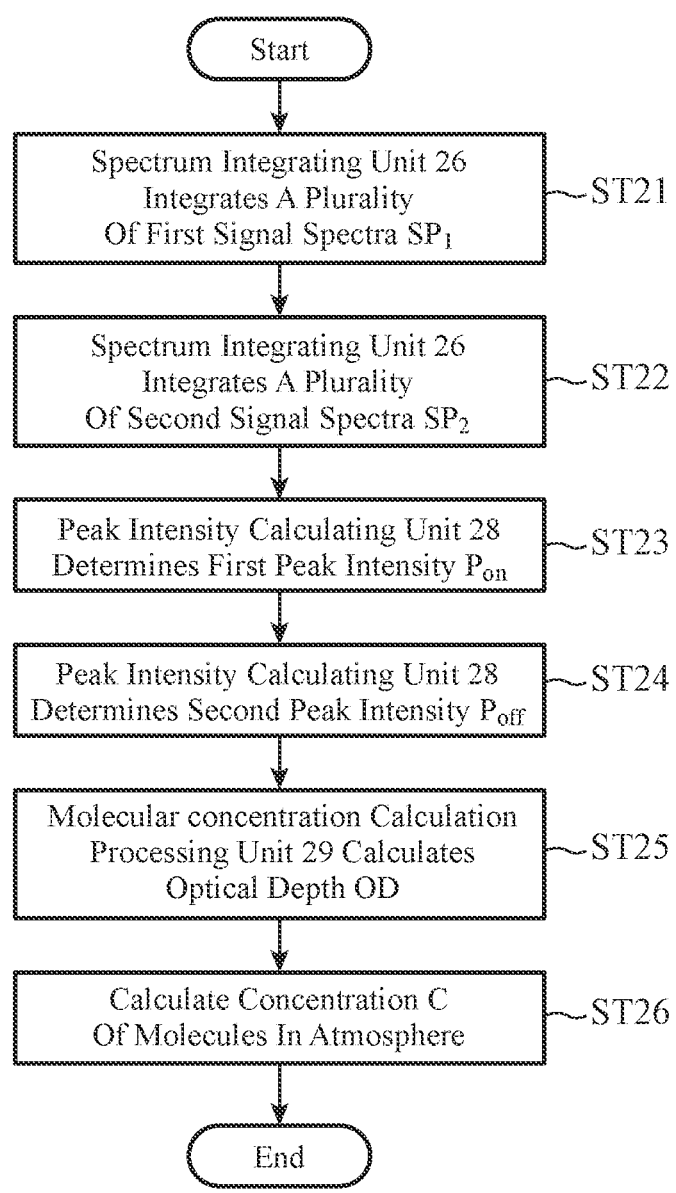
FIG. 6 is a flowchart illustrating a procedure when the signal processor 11 is implemented as software or firmware.

FIGS. 5 and 6 are flowcharts illustrating the procedure when the signal processor 11 is implemented by using software or firmware.

Also, FIG. 3 illustrates an example in which each of the components of the signal processor 11 is implemented by the dedicated hardware, and FIG. 4 illustrates an example in which the signal processor 11 is implemented by using software or firmware; however, some components in the signal processor 11 may be implemented by the dedicated hardware and remaining components may be implemented by using software or firmware.

Operations are next described.

The reference light source 1 outputs the first laser light beam $Lb_1$ to the optical distributor 3 when receiving the wavelength selecting signal indicating that the first laser light beam $Lb_1$ being the laser light beam of the wavelength absorbed by the molecule in the atmosphere is output from the wavelength selector 2.

The reference light source 1 also outputs the second laser light beam $Lb_2$ to the optical distributor 3 when receiving the wavelength selecting signal indicating that the second laser light beam $Lb_2$ being the laser light beam of the wavelength not absorbed by the molecule in the atmosphere is output from the wavelength selector 2.

In Embodiment 1, it is assumed that the reference light source 1 alternately outputs the first laser light beam $Lb_1$ and the second laser light beam $Lb_2$, but the reference light source 1 may simultaneously output the first laser light beam $Lb_1$ and the second laser light beam $Lb_2$.

When receiving the first laser light beam $Lb_1$ from the reference light source 1, the optical distributor 3 distributes the first laser light beam $Lb_1$ to the pulse modulator 4 and the optical coupler 8 at a predetermined ratio.

When receiving the second laser light beam $Lb_2$ from the reference light source 1, the optical distributor 3 distributes the second laser light beam $Lb_2$ to the pulse modulator 4 and the optical coupler 8 at a predetermined ratio.

When receiving the first laser light beam $Lb_1$ from the optical distributor 3, the pulse modulator 4 performs pulse modulation of the first laser light beam $Lb_1$.

When receiving the second laser light beam $Lb_2$ from the optical distributor 3, the pulse modulator 4 performs pulse modulation of the second laser light beam $Lb_2$.

As examples of the pulse modulation of the first laser light beam $Lb_1$ and the second laser light beam $Lb_2$, the pulse modulator 4 performs intensity modulation of the first laser light beam $Lb_1$ and the second laser light beam $Lb_2$ such that the shapes of the light intensity of the first laser light beam $Lb_1$ and the second laser light beam $Lb_2$ have a Gaussian shape or a rectangular shape.

The pulse modulator 4 also performs the frequency shift to shift the frequency of the first laser light beam $Lb_1$ and the second laser light beam $Lb_2$ as the pulse modulation of the first laser light beam $Lb_1$ and the second laser light beam $Lb_2$. A frequency shift amount of the first laser light beam $Lb_1$ and the second laser light beam $Lb_2$ is, for example, in a range of 20 MHz to 200 MHz.

As a result, the pulse modulator 4 outputs the first laser light beam $Lb_1$ and the second laser light beam $Lb_2$ after the pulse modulation to the optical amplifier 5.

When receiving the first laser light beam $Lb_1$ after the pulse modulation from the pulse modulator 4, the optical amplifier 5 amplifies the intensity of the first laser light beam $Lb_1$ after the pulse modulation and outputs the first laser light beam $Lb_1$ after the intensity amplification to the optical circulator 6.

When receiving the second laser light beam $Lb_2$ after the pulse modulation from the pulse modulator 4, the optical amplifier 5 amplifies the intensity of the second laser light beam $Lb_2$ after the pulse modulation and outputs the second laser light beam $Lb_2$ after the intensity amplification to the optical circulator 6.

When receiving the first laser light beam $Lb_1$ after the intensity amplification from the optical amplifier 5, the optical circulator 6 outputs the first laser light beam $Lb_1$ after the intensity amplification to the optical antenna 7.

When receiving the second laser light beam $Lb_2$ after the intensity amplification from the optical amplifier 5, the optical circulator 6 outputs the second laser light beam $Lb_2$ after the intensity amplification to the optical antenna 7.

When receiving the first laser light beam $Lb_1$ after the intensity amplification from the optical circulator 6, the optical antenna 7 expands the beam diameter of the first laser light beam $Lb_1$ after the intensity amplification and emits the first laser light beam $Lb_1$ after the intensity amplification into the atmosphere.

When receiving the second laser light beam $Lb_2$ after the intensity amplification from the optical circulator 6, the optical antenna 7 expands the beam diameter of the second laser light beam $Lb_2$ after the intensity amplification and emits the second laser light beam $Lb_2$ after the intensity amplification into the atmosphere.

After emitting the first laser light beam $Lb_1$ after the intensity amplification into the atmosphere, the optical antenna 7 receives the first scattered light $Sb_1$ being the scattered light of the first laser light beam $Lb_1$ scattered by the aerosol or the hard target in the atmosphere and outputs the first scattered light $Sb_1$ to the optical circulator 6.

After emitting the second laser light beam $Lb_2$ after the intensity amplification into the atmosphere, the optical antenna 7 receives the second scattered light $Sb_2$ being the scattered light of the second laser light beam $Lb_2$ scattered by the aerosol or the hard target in the atmosphere and outputs the second scattered light $Sb_2$ to the optical circulator 6.

When receiving the first scattered light $Sb_1$ from the optical antenna 7, the optical circulator 6 outputs the first scattered light $Sb_1$ to the optical coupler 8, and when receiving the second scattered light $Sb_2$ from the optical antenna 7, it outputs the second scattered light $Sb_2$ to the optical coupler 8.

When receiving the first scattered light $Sb_1$ from the optical circulator 6, the optical coupler 8 combines the first scattered light $Sb_1$ and the first laser light beam $Lb_1$ output from the optical distributor 3 and outputs the first combined light beam $Cb_1$ being the combined light beam of the first scattered light $Sb_1$ and the first laser light beam $Lb_1$ to the optical receiver 9 after branching the same at a ratio of 50 to 50.

When receiving the second scattered light $Sb_2$ from the optical circulator 6, the optical coupler 8 combines the second scattered light $Sb_2$ and the second laser light beam $Lb_2$ output from the optical distributor 3 and outputs the second combined light beam $Cb_2$ being the combined light beam of the second scattered light $Sb_2$ and the second laser light beam $Lb_2$ to the optical receiver 9 after branching the same at a ratio of 50 to 50.

When receiving two first combined light beams $Cb_1$ branched at a ratio of 50 to 50 from the optical coupler 8, the optical receiver 9 performs heterodyne detection on the two first combined light beams $Cb_1$ and outputs the first reception signal $R_1$ being the reception signal of the first combined light beam $Cb_1$ to the A/D converter 10.

When receiving two second combined light beams $Cb_2$ branched at a ratio of 50 to 50 from the optical coupler 8, the optical receiver 9 performs heterodyne detection on the two second combined light beam $Cb_2$ and outputs the second reception signal $R_2$ being the reception signal of the second combined light beam $Cb_2$ to the A/D converter 10.

The heterodyne-detection of the first combined light beam $Cb_1$ and the second combined light beam $Cb_2$ by the optical receiver 9 is balanced detection capable of reducing common mode noise.

Figure 7:
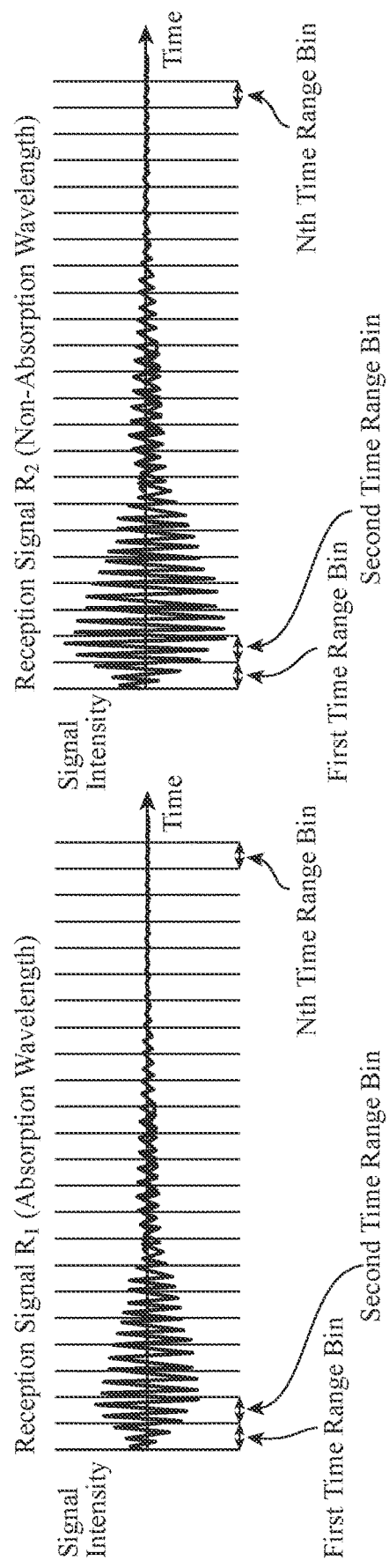
FIG. 7A is an illustrative view illustrating a waveform example of a first reception signal $R_1$.
FIG. 7B is an illustrative view illustrating a waveform example of a second reception signal $R_2$.

Herein, FIG. 7 is an illustrative view illustrating waveform examples of the first reception signal $R_1$ and the second reception signal $R_2$ output from the optical receiver 9.

FIG. 7A illustrates the waveform example of the first reception signal $R_1$, and FIG. 7B illustrates the waveform example of the second reception signal $R_2$.

In FIG. 7, time is plotted along the abscissa axis and signal intensity of the reception signal is plotted along the ordinate axis.

In FIG. 7, the time range is divided into N and the signal intensity of first to Nth time range bins is illustrated.

When receiving the analog first reception signal $R_1$ and second reception signal $R_2$ from the optical receiver 9, the A/D converter 10 converts the analog first reception signal $R_1$ and second reception signal $R_2$ to digital signals, and outputs the reception data $DR_1$ and $DR_2$ which are the digital signals to the signal processor 11.

The signal processor 11 controls the wavelength selecting signal output from the wavelength selector 2.

In Embodiment 1, as described above, the signal processor 11 controls the wavelength selecting signal output from the wavelength selector 2 so that the reference light source 1 alternately outputs the first laser light beam $Lb_1$ and the second laser light beam $Lb_2$.

When receiving the reception data $DR_1$ and $DR_2$ being the digital signals from the A/D converter 10, the signal processor 11 calculates the concentration C of the molecules in the atmosphere on the basis of the reception data $DR_1$ and $DR_2$.

Hereinafter, a calculating process of the molecular concentration C by the signal processor 11 is specifically described.

If the A/D converter 10 outputs the reception data $DR_1$ (step ST1 in FIG. 5: YES), then the Fourier transforming unit 22 of the signal processor 11 calculates a plurality of first signal spectra $SP_1$ for each time range as the signals in the frequency domain of the reception data $DR_1$ by performing the FFT on the reception data $DR_1$ (step ST2 in FIG. 5).

In addition, when the A/D converter 10 outputs the reception data $DR_2$ (step ST3 in FIG. 5: YES), the Fourier transforming unit 22 calculates a plurality of second signal spectra $SP_2$ for each time range as the signals in the frequency domain of the reception data $DR_2$ by performing the FFT on the reception data $DR_2$ (step ST4 in FIG. 5).

In Embodiment 1, the Fourier transforming unit 22 calculates a plurality of first signal spectra $SP_1$ and a plurality of second signal spectra $SP_2$ in the first to Nth time range bins by performing the FFT on the reception data $DR_1$ and $DR_2$ of the first to Nth time range bins.

Note that, when the reception data $DR_1$ and $DR_2$ are not output from the A/D converter 10 (steps ST1 and ST3 in FIG. 5: NO), the Fourier transforming unit 22 stands by until the reception data $DR_1$ or $DR_2$ is output from the A/D converter 10.

Figure 8:
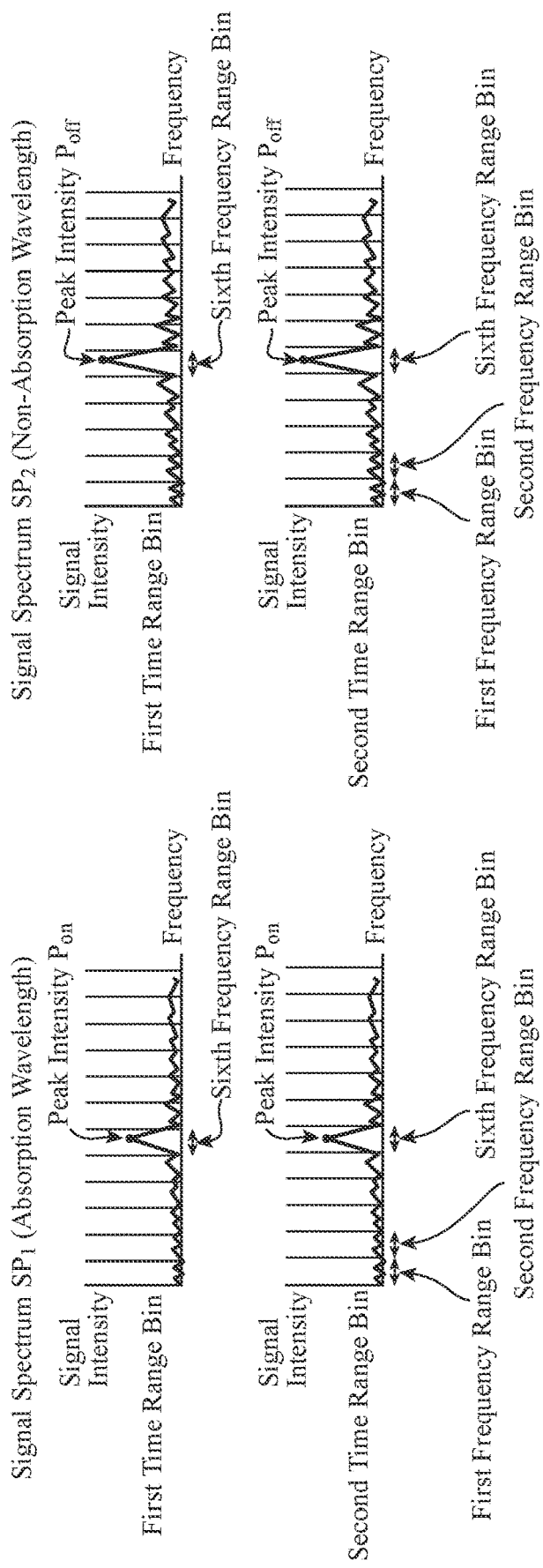
FIG. 8A is an illustrative view illustrating a first signal spectra $SP_1$ of a first time range bin and a second time range bin calculated by a Fourier transforming unit 22 and FIG. 8B is an illustrative view illustrating a second signal spectra $SP_2$ of a first time range bin and a second time range bin calculated by the Fourier transforming unit 22.

FIG. 8 is an illustrative view illustrating an example of calculation of the first signal spectrum $SP_1$ and the second signal spectrum $SP_2$ by the Fourier transforming unit 22.

FIG. 8A illustrates the first signal spectra $SP_1$ of the first time range bin and the second time range bin calculated by the Fourier transforming unit 22, and FIG. 8B illustrates the second signal spectra $SP_2$ of the first time range bin and the second time range bin calculated by the Fourier transforming unit 22.

In FIG. 8, the frequency is plotted along the abscissa axis and the signal intensity is plotted along the ordinate axis.

FIG. 8 illustrates the example in which there is no change in the position of the aerosol in the atmosphere.

When there is no change in the position of the aerosol in the atmosphere, peak positions being frequencies corresponding to the peak intensities $P_{on}$ of a plurality of first signal spectra $SP_1$ within the same time range are in the same position. Also, even when the time range is different, as illustrated in FIG. 8A, the peak positions being the frequencies corresponding to the peak intensities $P_{on}$ of the first signal spectra $SP_1$ are in the same position.

Also, when there is no change in the position of the aerosol in the atmosphere, the peak positions being frequencies corresponding to the peak intensities $P_{off}$ of a plurality of second signal spectra $SP_2$ within the same time range are in the same position. Also, even when the time range is different, as illustrated in FIG. 8B, the peak positions being the frequencies corresponding to the peak intensities $P_{off}$ of the second signal spectra $SP_2$ are in the same position.

In the examples in FIGS. 8A and 8D, the peak intensity $P_{on}$ of the first signal spectrum $SP_1$ and the peak intensity $P_{off}$ of the second signal spectrum $SP_2$ are all present in a sixth frequency range bin in both the first time range bin and the second time range bin.

Figure 9:
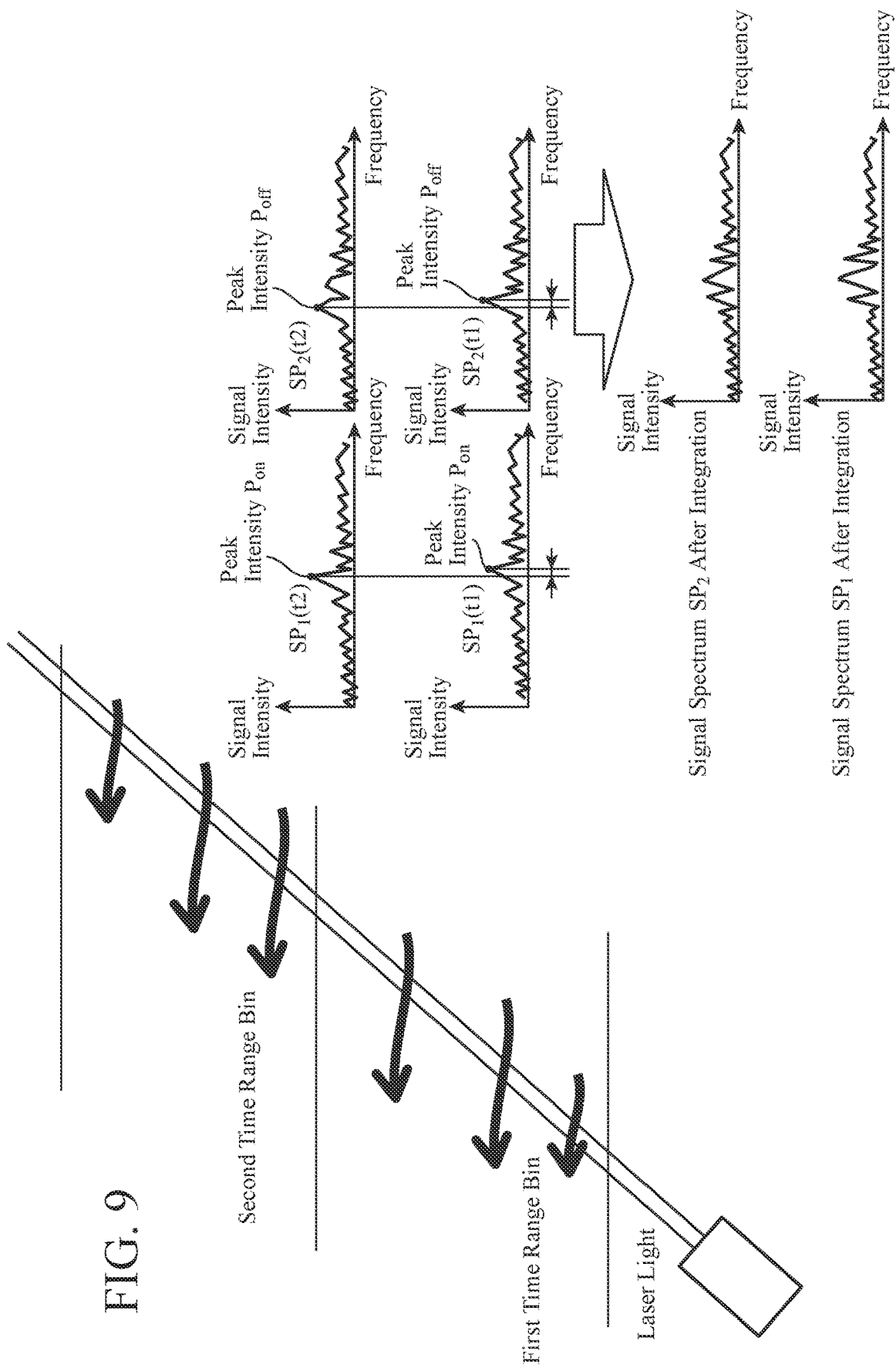
FIG. 9 is an illustrative view illustrating an example of the first signal spectrum $SP_1$ and the second signal spectrum $SP_2$ calculated by the Fourier transforming unit 22 in a situation where a position of aerosol in the atmosphere changes due to an influence of wind.

FIG. 9 is an illustrative view illustrating an example of the first signal spectra $SP_1$ and the second signal spectra $SP_2$ calculated by the Fourier transforming unit 22 in a situation where the position of the aerosol in the atmosphere is changes due to an influence of wind.

As illustrated in FIG. 9, the frequencies corresponding to the peak intensities $P_{on}$ of a plurality of first signal spectra $SP_1$ within the first time range bin are different, and the frequencies corresponding to the peak intensities $P_{off}$ of a plurality of second signal spectra $SP_2$ within the first time range bin are different.

That is, the frequency corresponding to the peak intensity $P_{on}$ of the first signal spectrum $SP_1(t1)$ at time t1 in the first time range bin and the frequency corresponding to the peak intensity $P_{on}$ of the first signal spectrum $SP_1(t2)$ at time t2 are different. Also, the frequency corresponding to the peak intensity $P_{off}$ of the second signal spectrum $SP_2(t1)$ at a time t1 in the first time range bin and the frequency corresponding to the peak intensity $P_{off}$ of the second signal spectrum $SP_2(t2)$ at time t2 are different.

In FIG. 9, only the first time range bin is illustrated, but there actually are the second time range bin to the Nth time range bin. N is an integer equal to or larger than three.

When there is no change in the position of the aerosol in the atmosphere, as described above, the peak positions being the frequencies corresponding to the peak intensities of a plurality of first signal spectra $SP_1$ are in the same position. Also, the peak positions being the frequencies corresponding to the peak intensities of a plurality of second signal spectra $SP_2$ are in the same position. Therefore, the spectrum integration processing unit 23 at a subsequent stage integrates a plurality of first signal spectra $SP_1$ within the same time range and integrates a plurality of second signal spectra $SP_2$ within the same time range, so that signal components corresponding to the aerosol being desired signal components are accumulated and an SN ratio is increased.

On the other hand, when there is a change in the position of the aerosol in the atmosphere, as illustrated in FIG. 9, the peak positions being the frequencies corresponding to the peak intensities are different positions even within the same time range. Therefore, even when the spectrum integration processing unit 23 at the subsequent stage integrates a plurality of first signal spectra $SP_1$ and a plurality of second signal spectra $SP_2$ within the same time range, the desired signal components are not accumulated and the SN ratio is not increased.

Therefore, when there is the change in the position of the aerosol in the atmosphere, it is difficult to improve identification accuracy of the first peak intensity $P_{on}$ and the second peak intensity $P_{off}$ by the peak intensity calculating unit 28 at the subsequent stage even when the spectrum integration processing unit 23 integrates a plurality of first signal spectra $SP_1$ and a plurality of second signal spectra $SP_2$ within the same time range for a long time (for example, 1 minute or longer). In the example in FIG. 9, since not only the desired signal component but also a plurality of signal components are increased in the first signal spectrum $SP_1$ after the integration and the second signal spectrum $SP_2$ after the integration, it becomes difficult to identify the first peak intensity $P_{on}$ and the second peak intensity $P_{off}$ corresponding to the desired signal component.

However, even when there is a change in the position of the aerosol in the atmosphere, by integrating a plurality of first signal spectra $SP_1$ and a plurality of second signal spectra $SP_2$ for a short time (for example, 4 seconds), an SN ratio is increased to such an extent that the frequency shift correcting unit 25 at the subsequent stage may calculate frequency shift amounts $fd_1$ and $fd_2$ of the first signal spectrum $SP_1$ and the second signal spectrum $SP_2$.

Since the signal intensity is small only with the signal spectrum of one time range, it is difficult for the frequency shift correcting unit 25 at the subsequent stage to calculate the frequency shift amount $fd_1$ of the first signal spectrum $SP_1$ and the frequency shift amount $fd_2$ of the second signal spectrum $SP_2$.

If the Fourier transforming unit 22 calculates a plurality of first signal spectra $SP_1$ for each time range, then the spectrum integration processing unit 23 integrates a plurality of first signal spectra $SP_1$ within the same time range, and outputs the first signal spectrum $SP_1$ obtained by integration to the noise removing unit 24 (step ST5 in FIG. 5).

Also, if the Fourier transforming unit 22 calculates a plurality of second signal spectra $SP_2$ for each time range, then the spectrum integration processing unit 23 integrates a plurality of second signal spectra $SP_2$ within the same time range, and outputs the second signal spectrum $SP_2$ obtained by integration to the noise removing unit 24 (step ST6 in FIG. 5).

The integrating process of a plurality of first signal spectra $SP_1$ within the same time range is to integrate the signal components of the same frequency in a plurality of first signal spectra $SP_1$ within the same time range.

Also, the integrating process of a plurality of second signal spectra $SP_2$ within the same time range is to integrate the signal components of the same frequency in a plurality of second signal spectra $SP_2$ within the same time range.

The spectrum integration processing unit 23 repeatedly performs the integrating process of the first signal spectrum $SP_1$ and the second signal spectrum $SP_2$ until the number of times of integration of the first signal spectrum $SP_1$ and the second signal spectrum $SP_2$ reaches the number of times set in advance or until the SN ratio reaches the SN ratio set in advance.

Note that, when the position of the aerosol in the atmosphere changes due to the influence of the wind, even when the spectrum integration processing unit 23 integrates the signal components of the same frequency, the SN ratio does not significantly increase, but the SN ratio is increased to such an extent that the frequency shift correcting unit 25 at the subsequent stage may calculate the frequency shift amounts $fd_1$ and $fd_2$.

If the noise removing unit 24 receives the first signal spectrum $SP_1$ obtained by integration from the spectrum integration processing unit 23, then it removes noise components included in the integrated first signal spectrum $SP_1$ and outputs the first signal spectrum $SP_1$ obtained by removing the noise components to the frequency shift correcting unit 25 (step ST7 in FIG. 5).

Also, if the noise removing unit 24 receives the second signal spectrum $SP_2$ obtained by integration from the spectrum integration processing unit 23, then it removes the noise components included in the integrated second signal spectrum $SP_2$ and outputs the second signal spectrum $SP_2$ obtained by removing the noise components to the frequency shift correcting unit 25 (step ST8 in FIG. 5).

FIG. 10 is an illustrative view illustrating signal spectra before and after a removing process of noise component is performed by the noise removing unit 24.

Figure 10A:
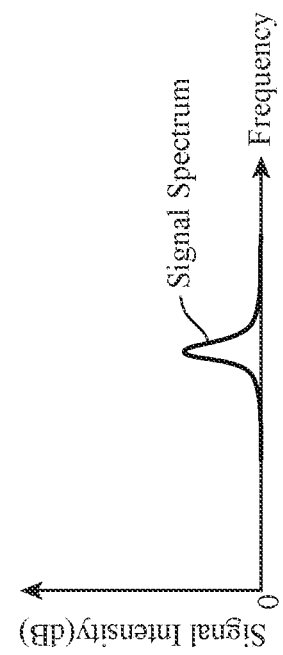
FIG. 10A is an illustrative view illustrating a signal spectrum and a noise spectrum before a noise removing unit 24 performs a removing process of noise component.
Figure 10B:
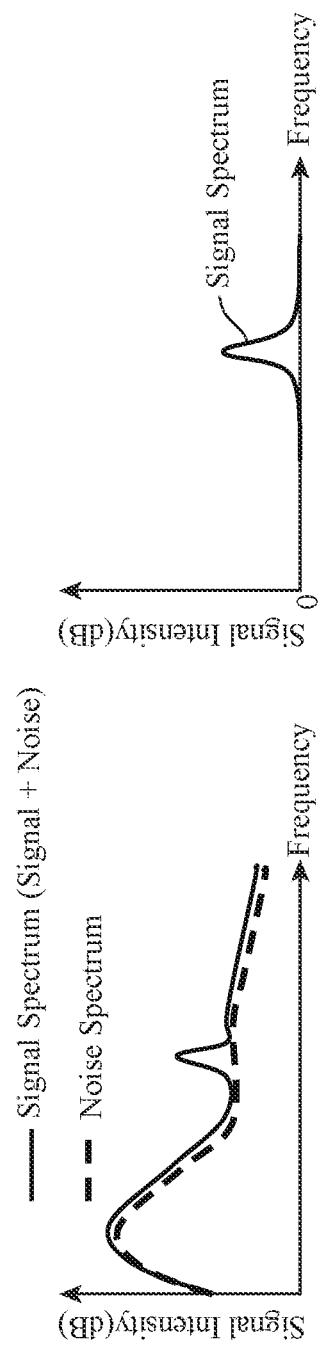
FIG. 10B is an illustrative view illustrating a signal spectrum after the noise removing unit 24 performs the removing process of noise component.

FIG. 10A illustrates a signal spectrum and a noise spectrum before the noise removing unit 24 performs a removing process of noise component, and FIG. 10B illustrates a signal spectrum after the noise removing unit 24 performs a removing process of noise component.

Hereinafter, the removing process of noise component by the noise removing unit 24 is specifically described.

As illustrated in FIG. 10A, the first signal spectrum $SP_1$ and the second signal spectrum $SP_2$ before the noise removing unit 24 performing a removing process of noise component include noise components such as thermal noise of the optical receiver 9 and amplification light noise emitted from the optical amplifier 5, in addition to a signal component corresponding to an aerosol which scatters the first laser light beam $Lb_1$ and the second laser light beam $Lb_2$.

Before performing a removing process of noise component, the noise removing unit 24 observes noise components such as the thermal noise of the optical receiver 9 and the amplification light noise emitted from the optical amplifier 5, and records a noise spectrum indicating the noise components.

The noise removing unit 24 removes the noise components included in the first signal spectrum $SP_1$ by subtracting the recorded noise spectrum from the first signal spectrum $SP_1$ obtained by integration by the spectrum integration processing unit 23 and outputs the first signal spectrum $SP_1$ as illustrated in FIG. 10B to the frequency shift correcting unit 25.

Also, the noise removing unit 24 removes the noise components included in the second signal spectrum $SP_2$ by subtracting the recorded noise spectrum from the second signal spectrum $SP_2$ obtained by integration by the spectrum integration processing unit 23 and outputs the second signal spectrum $SP_2$ as illustrated in FIG. 10B to the frequency shift correcting unit 25.

If the frequency shift correcting unit 25 receives the first signal spectrum $SP_1$ obtained after the noise component removal from the noise removing unit 24, then it calculates the frequency shift amount $fd_1$ of the first signal spectrum $SP_1$ obtained after the noise component removal with respect to the frequency of the first laser light beam $Lb_1$ emitted from the optical antenna 7.

The frequency shift amount $fd_1$ corresponds to a Doppler shift amount of the first scattered light $Sb_1$ associated with the change in the position of the aerosol in the atmosphere.

Since the calculating process of the Doppler shift amount is a well-known technology, this is not described in detail; the Doppler shift amount may be obtained from a difference between the frequency of the first laser light beam $Lb_1$ emitted from the optical antenna 7 and the frequency of the first scattered light $Sb_1$.

If the frequency shift correcting unit 25 calculates the frequency shift amount $fd_1$, then it shifts the frequency of the first signal spectrum $SP_1$ obtained after the noise component removal by the shift amount $fd_1$ to correct the frequency of the first signal spectrum $SP_1$ obtained after the noise component removal to have the frequency without Doppler shift (step ST9 in FIG. 5).

Also, if the frequency shift correcting unit 25 receives the second signal spectrum $SP_2$ obtained after the noise component removal from the noise removing unit 24, then it calculates the frequency shift amount $fd_2$ of the second signal spectrum $SP_2$ obtained after the noise component removal with respect to the frequency of the second laser light beam $Lb_2$ emitted from the optical antenna 7. The shift amount $fd_2$ may be calculated from a difference between the frequency of the second laser light beam $Lb_2$ emitted from the optical antenna 7 and the frequency of the second scattered light $Sb_2$.

If the frequency shift correcting unit 25 calculates the frequency shift amount $fd_2$, then it shifts the frequency of the second signal spectrum $SP_2$ obtained after the noise component removal by the shift amount $fd_2$ to correct the frequency of the second signal spectrum $SP_2$ obtained after the noise component removal to have the frequency without Doppler shift (step ST10 in FIG. 5).

Figure 11:
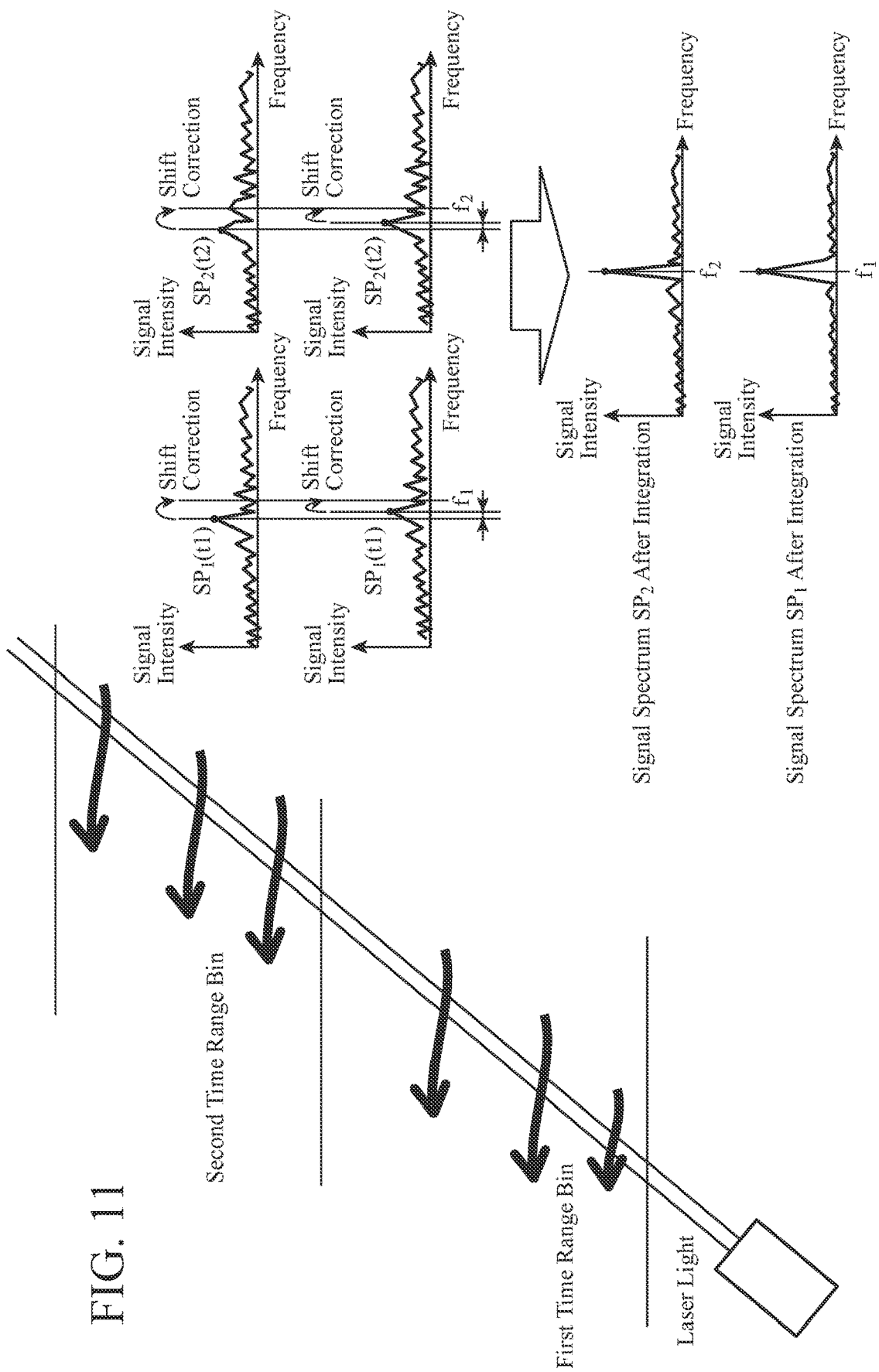
FIG. 11 is an illustrative view illustrating shift correction of a frequency of the signal spectrum by the frequency shift correcting unit 25.

FIG. 11 is an illustrative view illustrating shift correction of the frequency of the signal spectrum by the frequency shift correcting unit 25.

FIG. 11 illustrates that the frequencies of first signal spectra $SP_1$ within the same time range are shifted by the frequency shift correcting unit 25, and the frequencies of second signal spectra $SP_2$ within the same time range are shifted, so that the frequencies of the signal components relating to the aerosol are present in the same frequency range bin.

In the example in FIG. 11, the frequency of the signal component corresponding to the aerosol included in a plurality of first signal spectra $SP_1$ after the shift correction is $f_1$. Also, the frequency of the signal component corresponding to the aerosol included in a plurality of second signal spectra $SP_2$ after the shift correction is $f_2$.

In FIG. 11, only the first time range bin is illustrated, but there actually are second to Mth time range bins. M is an integer equal to or larger than three.

However, since the integrating process is performed by the spectrum integration processing unit 23 on the preceding stage, one first signal spectrum $SP_1$ in FIG. 11 is associated with a plurality of first signal spectra $SP_1$ in FIG. 9. Also, one second signal spectrum $SP_2$ in FIG. 11 is associated with a plurality of second signal spectra $SP_2$ in FIG. 9.

For example, in a case in which the number of times of integration of the first signal spectrum $SP_1$ and the second signal spectrum $SP_2$ by the spectrum integration processing unit 23 is five, a first signal spectrum $SP_1(t1)$ in FIG. 11 corresponds to first signal spectra $SP_1(t1)$ to $SP_1(t5)$ at five timings t=1 to 5 in the same time range in FIG. 9, and a second signal spectrum $SP_2(t1)$ in FIG. 11 correspond to second signal spectra $SP_2(t1)$ to $SP_2(t5)$ at five timings t=1 to 5 within the same time range in FIG. 9.

Similarly, a first signal spectrum $SP_1(t2)$ in FIG. 11 corresponds to first signal spectra $SP_1(t6)$ to $SP_1(t10)$ at five timings t=6 to 10 within the same time range in FIG. 9. A second signal spectrum $SP_2(t2)$ in FIG. 11 corresponds to second signal spectra SP$_2$(t6) to SP$_2$(t10) at five timings t=6 to 10 within the same time range in FIG. 9.

Herein, an example in which the frequency shift correcting unit 25 corrects to allow the frequency of the first signal spectrum SP$_1$ to coincide with the frequency of the first laser light beam Lb$_1$, and corrects to allow the frequency of the second signal spectrum SP$_2$ to coincide with the frequency of the second laser light beam Lb$_2$.

A method of correcting the frequencies of the first signal spectrum SP$_1$ and the second signal spectrum SP$_2$ is not limited to the above-described example.

For example, it is also possible that the frequency shift correcting unit 25 corrects the frequencies of a plurality of first signal spectra SP$_1$ so that the frequencies of a plurality of first signal spectra SP$_1$ within the same time range have the same Doppler shift amount. Also, it is possible that the frequency shift correcting unit 25 corrects the frequencies of a plurality of second signal spectra SP$_2$ so that the frequencies of a plurality of second signal spectra SP$_2$ within the same time range have the same Doppler shift amount.

Specifically, an example is considered in which the frequency shift correcting unit 25 corrects the frequencies of a plurality of first signal spectra SP$_1$ within the same time range such that the Doppler shift amounts of a plurality of first signal spectra SP$_1$ within the same time range are the same as the Doppler shift amount of the first signal spectrum SP$_1$ which is the reference within the same time range. For example, the first signal spectrum SP$_1$ at time t1 is conceivable as the first signal spectrum SP$_1$ as the reference within the same time range.

Also, an example is considered in which the frequency shift correcting unit 25 corrects the frequencies of a plurality of second signal spectra SP$_2$ within the same time range such that the Doppler shift amounts of a plurality of second signal spectra SP$_2$ within the same time range are the same as the Doppler shift amount of the second signal spectrum SP$_2$ which is the reference within the same time range.

The processes at steps ST1 to ST10 are repeatedly executed until the time elapsed since the signal processor 11 starts processing elapses an observation time set in advance (step ST11: NO).

When the time elapsed since the signal processor 11 starts processing elapses the observation time (step ST11: YES), the repetition processes at steps ST1 to ST10 are terminated.

Note that, when the frequency shifts of a plurality of first signal spectra SP$_1$ and a plurality of second signal spectra SP$_2$ in the first to M time range bins are corrected by the frequency shift correcting unit 25 during the observation time, a plurality of first signal spectra SP$_1$ and a plurality of second signal spectra SP$_2$ in the first to Mth time range bins in which the frequency shifts are corrected are stored in the spectrum integrating unit 26.

The spectrum integrating unit 26 integrates a plurality of stored first signal spectra SP$_1$ within the same time range in the first to Mth time range bins and outputs the integrated first signal spectrum SP$_1$ to the peak intensity calculating unit 28 (step ST21 in FIG. 6).

Also, the spectrum integrating unit 26 integrates a plurality of stored second signal spectra SP$_2$ within the same time range and outputs the integrated second signal spectrum SP$_2$ to the peak intensity calculating unit 28 (step ST22 in FIG. 6).

The integrating process of a plurality of first signal spectra SP$_1$ within the same time range is to integrate the signal components of the same frequency in each first signal spectrum SP$_1$.

Also, the integrating process of a plurality of second signal spectra SP$_2$ within the same time range is to integrate the signal components of the same frequency in each second signal spectrum SP$_2$.

A plurality of first signal spectra SP$_1$ the frequencies of which are shifted by the frequency shift correcting unit 25 is integrated and a plurality of second signal spectra SP$_2$ the frequencies of which are shifted by the frequency shift correcting unit 25 is integrated, so that even when there is a change in the position of the aerosol in the atmosphere, the signal components corresponding to the aerosol being the desired signal components are accumulated, and the SN ratio is increased.

The peak intensity calculating unit 28 compares the respective signal components in the first signal spectrum SP$_1$ obtained by integration by the spectrum integrating unit 26 and identifies the first peak intensity P$_{on}$ that has the largest signal component (step ST23 in FIG. 6).

Also, the peak intensity calculating unit 28 compares the respective signal components in the second signal spectrum SP$_2$ obtained by integration by the spectrum integrating unit 26 and identifies the second peak intensity P$_{off}$ that has the largest signal component (step ST24 in FIG. 6).

The molecular concentration calculation processing unit 29 calculates the concentration C of the molecules in the atmosphere from the first peak intensity P$_{on}$ identified by the peak intensity calculating unit 28 and the second peak intensity P$_{off}$ identified by the peak intensity calculating unit 28.

Hereinafter, the calculating process of the molecular concentration C by the molecular concentration calculation processing unit 29 is specifically described.

First, in a case of performing the calculating process of the molecular concentration C in an mth (m=2, 3, . . . , M) time range bin, the molecular concentration calculation processing unit 29 obtains a peak intensity P$_{on(m)}$ being the first peak intensity P$_{on}$ of the mth time range bin and a Peak intensity P$_{off(m)}$ being the second peak intensity P$_{off}$ of the mth time range bin.

Also, the molecular concentration calculation processing unit 29 obtains a peak intensity P$_{on(m-1)}$ being the first peak intensity P$_{on}$ of an (m−1)th time range bin and a peak intensity P$_{off(m-1)}$ being the second peak intensity P$_{off}$ of the (m−1)th time range bin.

Next, in accordance with Equation (1) below, the molecular concentration calculation processing unit 29 calculates an optical depth OD using the peak intensity P$_{on(m)}$ and the peak intensity P$_{off(m)}$ of the mth time range bin and the peak intensity P$_{on(m-1)}$ and the peak intensity P$_{off(m-1)}$ of the (m−1)th time range bin (step ST25 in FIG. 6).

$$OD = \frac{P_{on(m)}}{P_{off(m)}} \times \frac{P_{off(m-1)}}{P_{on(m-1)}} \qquad (1)$$

The optical depth OD is a ratio of the peak intensity P$_{on(m)}$ and the peak intensity P$_{off(m)}$ in the mth time range bin.

In Eq. (1), P$_{on(m)}$/P$_{off(m)}$ is multiplied by P$_{off(m-1)}$/P$_{on(m-1)}$ to normalize the optical depth OD.

Next, in accordance with Equation (2) below, the molecular concentration calculation processing unit 29. calculates the concentration C of the molecules in the atmosphere by using the optical depth OD, a distance z between the position of the aerosol corresponding to the mth time range bin and the optical antenna 7, an absorption coefficient k$_{on}$ of the absorption wavelength, and an absorption coefficient k$_{off}$ of the non absorption wavelength (step ST26 in FIG. 6). The absorption coefficient $k_{on}$ and the absorption coefficient $k_{off}$ are known coefficients.

$$C = \frac{OD}{z(k_{on} - k_{off})} \quad (2)$$

As is apparent from the above-description, according to Embodiment 1, the frequency shift correcting unit 25 which corrects the frequency shift of a plurality of first signal spectra $SP_1$ within the same time range with respect to the frequency of the first laser light beam $Lb_1$ and corrects the frequency shift of a plurality of second signal spectra $SP_2$ within the same time range with respect to the frequency of the second laser light beam $Lb_2$ and the spectrum integrating unit 26 which integrates a plurality of first signal spectra $SP_1$ corrected by the frequency shift correcting unit 25 and integrates a plurality of second signal spectra $SP_2$ corrected by the frequency shift correcting unit 25 are provided, and the molecular concentration calculating unit 27 is configured to calculate the concentration C of the molecules in the atmosphere from the first signal spectrum $SP_1$ integrated by the spectrum integrating unit 26 and the second signal spectrum $SP_2$ integrated by the spectrum integrating unit 26, so that there is an effect of preventing deterioration in calculation accuracy of the molecular concentration C even when there is the change in the position of the aerosol in the atmosphere.

Especially, when improving the accuracy in molecular concentration measurement when the atmosphere molecule is water vapor and the absorption spectrum intensity in the wavelength of 1.5 μm band is small, it is required to measure the peak intensity of the absorption wavelength and the non-absorption wavelength at a high SN ratio to calculate the difference. In this case, it is necessary to integrate for a long time such as several minutes to several tens of minutes, but according to Embodiment 1, even when the position of the aerosol in the atmosphere changes, there is an effect of preventing deterioration in calculation accuracy of the molecular concentration.

Embodiment 2

In the above-described Embodiment 1, the example in which the spectrum integration processing unit 23 integrates the signal components of the same frequency in a plurality of first signal spectra $SP_1$ and a plurality of second signal spectra $SP_2$ is illustrated as the integrating process of a plurality of first signal spectra $SP_1$ within the same time range and a plurality of second signal spectra $SP_2$ within the same time range.

In Embodiment 2, an example in which a spectrum integration processing unit 23 integrates signal components of different frequencies in a plurality of first signal spectra $SP_1$ and a plurality of second signal spectra $SP_2$ is described.

Detailed explanations are as follows.

Herein, an example in which the number of times of integration of the first signal spectrum $SP_1$ and the second signal spectrum $SP_2$ by the spectrum integration processing unit 23 is six is described.

A plurality of combinations of frequencies the signal components of which in the first signal spectra $SP_1$ and the second signal spectra $SP_2$ at time t1 to t6 within the same time range are integrated is prepared in advance in the spectrum integration processing unit 23.

For example, a combination pattern A, a combination pattern B, and a combination pattern C are exemplified as patterns of combinations of the frequencies when integrating the signal spectra at time t1 to t6 within the same time range.

signal component in mth frequency range bin of signal spectrum after integration=signal component in mth frequency range bin at time $t$1+signal component in mth frequency range bin at time $t$2+signal component in mth frequency range bin at time $t$3+signal component in (m+1)th frequency range bin at time $t$4+signal component in (m+1)th frequency range bin at time $t$5+signal component in (m+1)th frequency range bin at time $t$6    [Combination Pattern A]

signal component in mth frequency range bin of signal spectrum after integration=signal component in mth frequency range bin at time $t$1+signal component in mth frequency range bin at time $t$2+signal component in (m+1)th frequency range bin at time $t$3+signal component in (m+1)th frequency range bin at time $t$4+signal component in (m+2)th frequency range bin at time $t$5+signal component in (m+2)th frequency range bin at time $t$6    [Combination Pattern B]

signal component in mth frequency range bin of signal spectrum after integration=signal component in mth frequency range bin at time $t$1+signal component in (m+1)th frequency range bin at time $t$2+signal component in (m+2)th frequency range bin at time $t$3+signal component in (m+3)th frequency range bin at time $t$4+signal component in (m+4)th frequency range bin at time $t$5+signal component in (m+5)th frequency range bin at time $t$6    [Combination Pattern C]

The spectrum integration processing unit 23 integrates the first signal spectra $SP_1$ obtained at time t1 to t6 and the second signal spectra $SP_2$ obtained at time t1 to t6 respectively in accordance with the combination pattern A, and integrates the first signal spectra $SP_1$ obtained at time t1 to t6 and the second signal spectra $SP_2$ obtained at time t1 to t6 respectively in accordance with the combination pattern B.

Also, the spectrum integration processing unit 23 integrates the first signal spectra $SP_1$ obtained at time t1 to t6 and the second signal spectra $SP_2$ obtained at time t1 to t6 respectively in accordance with the combination pattern C.

The spectrum integration processing unit 23 compares the maximum signal components in the first signal spectra $SP_1$ each integrated in accordance with the combination pattern A, B or C, and selects the first signal spectrum $SP_1$ the maximum signal component of which is the maximum among the three first signal spectra $SP_1$ after the integration.

The spectrum integration processing unit 23 outputs the selected first signal spectrum $SP_1$ to a peak intensity calculating unit 28 as the integrated first signal spectrum $SP_1$.

Also, the spectrum integration processing unit 23 compares the maximum signal components in the second signal spectra $SP_2$ each integrated based on the combination pattern A, B or C, and selects the second signal spectrum $SP_2$ the maximum signal component of which is the maximum among the three second signal spectra $SP_2$ after the integration.

The spectrum integration processing unit 23 outputs the selected second signal spectrum $SP_2$ to the peak intensity calculating unit 28 as the integrated second signal spectrum $SP_2$.

As is apparent from the description above, according to Embodiment 2, the spectrum integration processing unit 23 is configured to select any one signal spectrum from the signal spectra after the integration corresponding to a plurality of combinations as the signal spectrum after the integration, so that an SN ratio may be increased further compared with that in Embodiment 1.

Embodiment 3

In Embodiment 1 described above, the example in which the frequency shift correcting unit 25 corrects the frequency shift of the first signal spectrum $SP_1$ with respect to the frequency of the first laser light beam $Lb_1$ and corrects the frequency shift of the second signal spectrum $SP_2$ with respect to the frequency of the second laser light beam $Lb_2$ is described.

As a result, even when the position of the aerosol in the atmosphere changes, it is possible to prevent deterioration in calculation accuracy of the molecular concentration C.

However, in an environment in which a wind speed or a wind direction changes in terms of time as in a turbulence flow, a frequency band of a signal component corresponding to aerosol included in a first signal spectrum $SP_1$ and a second signal spectrum $SP_2$ calculated by the Fourier transforming unit 22 can be broadened.

As the frequency band of the signal component corresponding to the aerosol is broadened, the signal component corresponding to the aerosol might be present in a plurality of frequency range bins, and identification accuracy of a first peak intensity $P_{on}$ and identification accuracy of a second peak intensity $P_{off}$ can be deteriorated.

In Embodiment 3, an example of preventing deterioration in calculation accuracy of molecular concentration by preventing deterioration in the identification accuracy of the first peak intensity $P_{on}$ and the identification accuracy of the second peak intensity $P_{off}$ also in the environment in which the wind speed or the wind direction changes in terms of time is described.

A configuration diagram of a laser radar device according to Embodiment 3 is the configuration diagram in FIG. 1, as in Embodiment 1.

Figure 12:
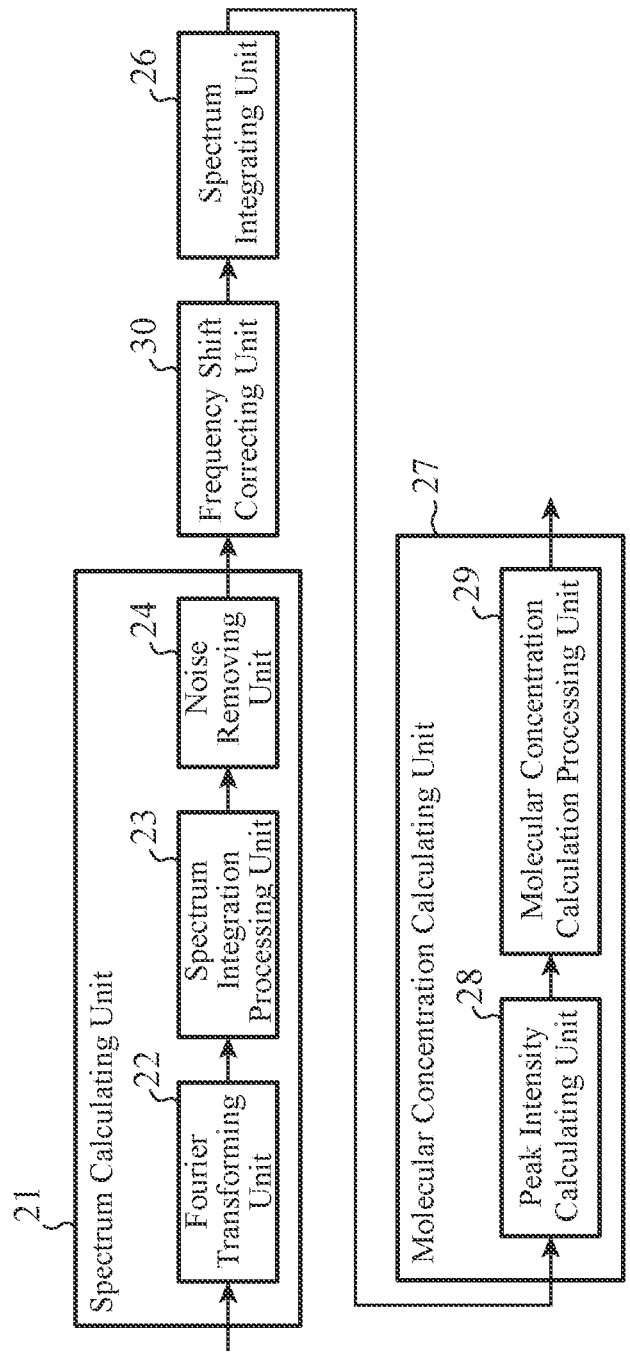
FIG. 12 is a configuration diagram illustrating a signal processor 11 of a laser radar device according to Embodiment 2 of the present disclosure.

FIG. 12 is a configuration diagram illustrating a signal processor 11 of the laser radar device according to Embodiment 3 of the present disclosure. In FIG. 12, the same reference signs as those in FIG. 2 represent the same or corresponding parts, so that the description thereof is omitted.

A frequency shift correcting unit 30 is implemented by the frequency shift correcting circuit 44 illustrated in FIG. 3, for example, as is the case with the frequency shift correcting unit 25 in FIG. 2.

The frequency shift correcting unit 30 performs a process of correcting a frequency shift of a plurality of first signal spectra $SP_1$ after noise component removal with respect to the frequency of the first laser light beam $Lb_1$ and correcting a frequency shift of a plurality of second signal spectra $SP_2$ after noise component removal with respect to the frequency of the second laser light beam $Lb_2$ as is the case with the frequency shift correcting unit 25 in FIG. 2.

However, unlike the frequency shift correcting unit 25 in FIG. 2, the frequency shift correcting unit 30 performs a process of correcting a waveform of the first signal spectrum $SP_1$ and the second signal spectrum $SP_2$ to be described hereinafter before performing the process of correcting the frequency shifts of the first signal spectrum $SP_1$ and the second signal spectrum $SP_2$.

The frequency shift correcting unit 30 performs a correcting process of waveform in which the signal component of the selected frequency is a total sum of the signal components equal to or larger than the threshold Th by selecting any one frequency out of equal to or more than one frequencies having a signal component equal to or larger than a threshold Th in each of the first signal spectrum $SP_1$ and the second signal spectrum $SP_2$ obtained after the noise component removal by a noise removing unit 24 and moving the signal component of the remaining frequency not selected to the selected frequency.

Hereinafter, the correcting process of waveform by the frequency shift correcting unit 30 is specifically described.

Figure 13:
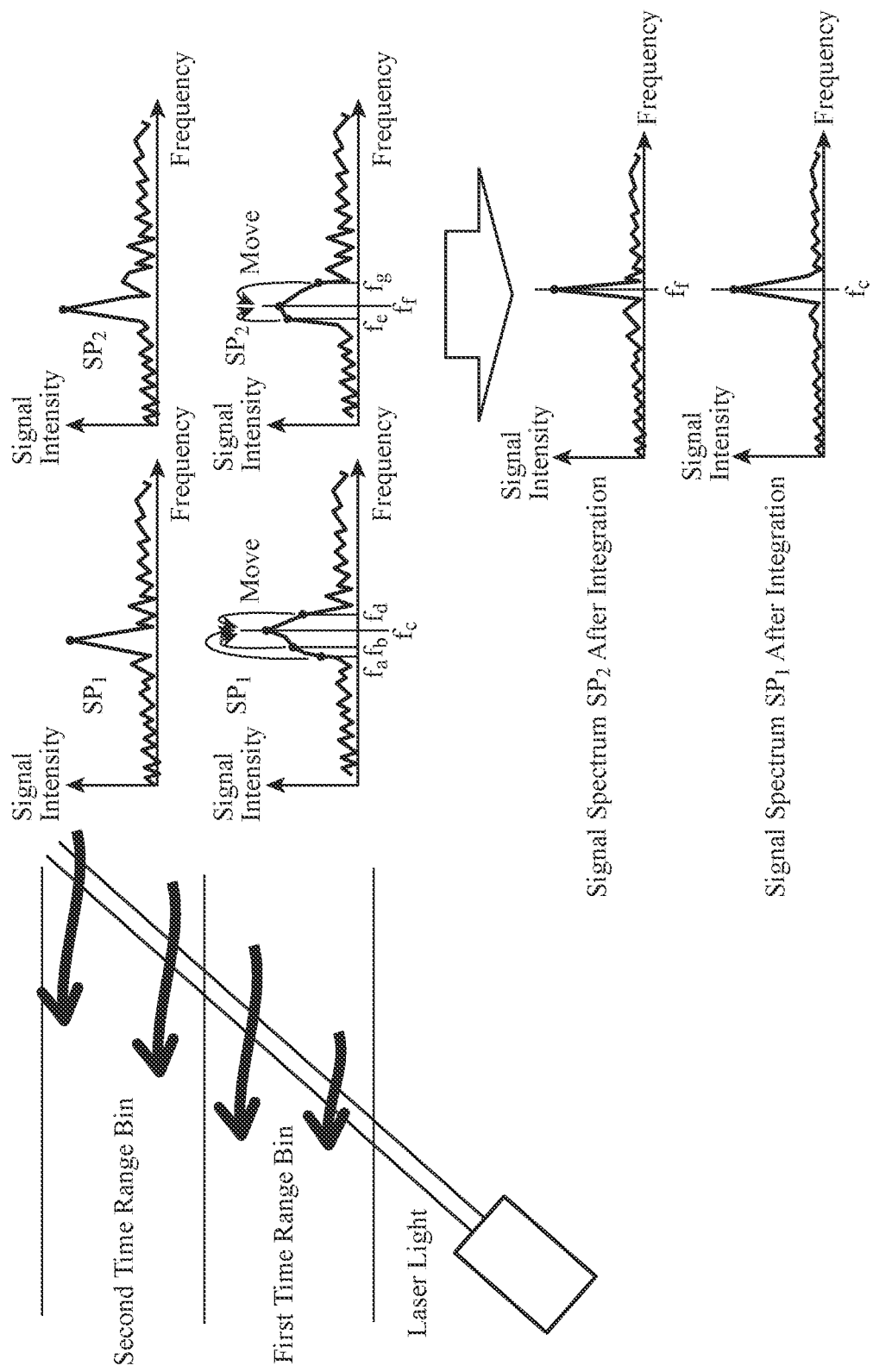
FIG. 13 is an illustrative view illustrating shift correction of a frequency of a signal spectrum by a frequency shift correcting unit 30.

FIG. 13 is an illustrative view illustrating the shift correction of the frequency of the signal spectrum by the frequency shift correcting unit 30.

FIG. 13 representatively illustrates only one first signal spectrum $SP_1$ in each of a first time range bin and a second time range bin. Also, only one second signal spectrum $SP_2$ in each of the first time range bin and the second time range bin is representatively illustrated.

The frequency shift correcting unit 30 compares the signal component in each of the first signal spectrum $SP_1$ after the noise component removal by the noise removing unit 24 and the second signal spectrum $SP_2$ after the noise component removal with the threshold Th set in advance and specifies the frequency having the signal component equal to or larger than the threshold Th. A value about half of assumed signal intensity of the signal component corresponding to the aerosol is set in the frequency shift correcting unit 30 as the threshold Th set in advance.

In the example in FIG. 13, as for the first signal spectrum $SP_1$ and the second signal spectrum $SP_2$ in the second time range bin, there is one frequency having the signal component equal to or larger than the threshold Th. Therefore, as for the first signal spectrum $SP_1$ and the second signal spectrum $SP_2$ in the second time range bin, the correcting process of the waveform by the frequency shift correcting unit 30 is not performed.

On the other hand, as for the first signal spectrum $SP_1$ in the first time range bin, there are four frequencies having the signal component equal to or larger than the threshold Th. Therefore, as for the first signal spectrum $SP_1$ in the first time range bin, the correcting process of the waveform by the frequency shift correcting unit 30 is performed.

Also, as for the second signal spectrum $SP_2$ in the first time range bin, there are three frequencies having the signal component equal to or larger than the threshold Th. Therefore, as for the second signal spectrum $SP_2$ in the first time range bin, the correcting process of the waveform by the frequency shift correcting unit 30 is performed.

The frequency shift correcting unit 30 selects one frequency $f_c$, for example, out of four frequencies $f_a$, $f_b$, $f_c$, and $f_d$ having the signal component equal to or larger than the threshold Th in the first signal spectrum $SP_1$ in the first time range bin.

When the frequency shift correcting unit 30 selects one frequency $f_c$, this makes the signal component of the frequency $f_c$ the total sum of the signal components of the four frequencies $f_a$, $f_b$, $f_c$, and $f_d$ by moving the signal components of the remaining three frequencies $f_a$, $f_b$, and $f_d$ to the frequency $f_c$.

Although the frequency $f_c$ is herein selected, this is merely an example, and any one of the frequencies $f_a$, $f_b$, and $f_d$ may be selected.

Also, by selecting the frequency within the range of the frequencies $f_a$ to $f_d$ and moving the signal components of the four frequencies $f_a$, $f_b$, $f_c$, and $f_d$ to the selected frequency, the signal component of the selected frequency may be made the total sum of the signal components of the four frequencies $f_a$, $f_b$, $f_c$, and $f_d$.

The frequency shift correcting unit 30 selects one frequency $f_f$, for example, out of the three frequencies $f_e$, $f_f$, and $f_g$ having the signal components equal to or larger than the threshold Th in the second signal spectrum $SP_2$ in the first time range bin.

When the frequency shift correcting unit 30 selects one frequency $f_f$, for example, this makes the signal component of the frequency $f_f$ the total sum of the signal components of the three frequencies $f_e$, $f_f$, and $f_g$. by moving the signal components of the remaining two frequencies $f_e$ and $f_g$ to the frequency $f_f$.

Although the frequency $f_f$ is herein selected, this is merely an example, and any one of the frequencies $f_e$ and $f_g$ may be selected.

Also, by selecting the frequency within the range of the frequencies $f_e$ to $f_g$ and moving the signal components of the three frequencies $f_e$, $f_f$, and $f_g$ to the selected frequency, the signal component of the selected frequency may be made the total sum of the signal components of the three frequencies $f_e$, $f_f$, and $f_g$.

As the frequency shift correcting unit 30 performs the correcting process of the waveform, the signal component corresponding to the aerosol is present only in one frequency range bin, so that the identification accuracy of the first peak intensity $P_{on}$ and the identification accuracy of the second peak intensity $P_{off}$ are improved.

After performing the correcting process of the waveform, the frequency shift correcting unit 30 performs a process of correcting the frequency shift of a plurality of first signal spectra $SP_1$ and correcting the frequency shift of a plurality of second signal spectra $SP_2$ as is the case with the frequency shift correcting unit 25 in FIG. 2.

In Embodiment 3, the deterioration in calculation accuracy of molecular concentration may be prevented because the identification accuracy of the first peak intensity $P_{on}$ and the identification accuracy of the second peak intensity $P_{off}$ are improved also in the environment in which the wind speed or the wind direction changes in terms of time as in the turbulence flow.

Embodiment 4

In Embodiments 1 to 3 described above, the example in which the molecular concentration calculating unit 27 calculates the concentration C of the molecules in the atmosphere is illustrated, but in Embodiment 4, an example in which a molecular concentration calculating unit 27 obtains a distribution of molecular concentrations C is described.

Figure 14:
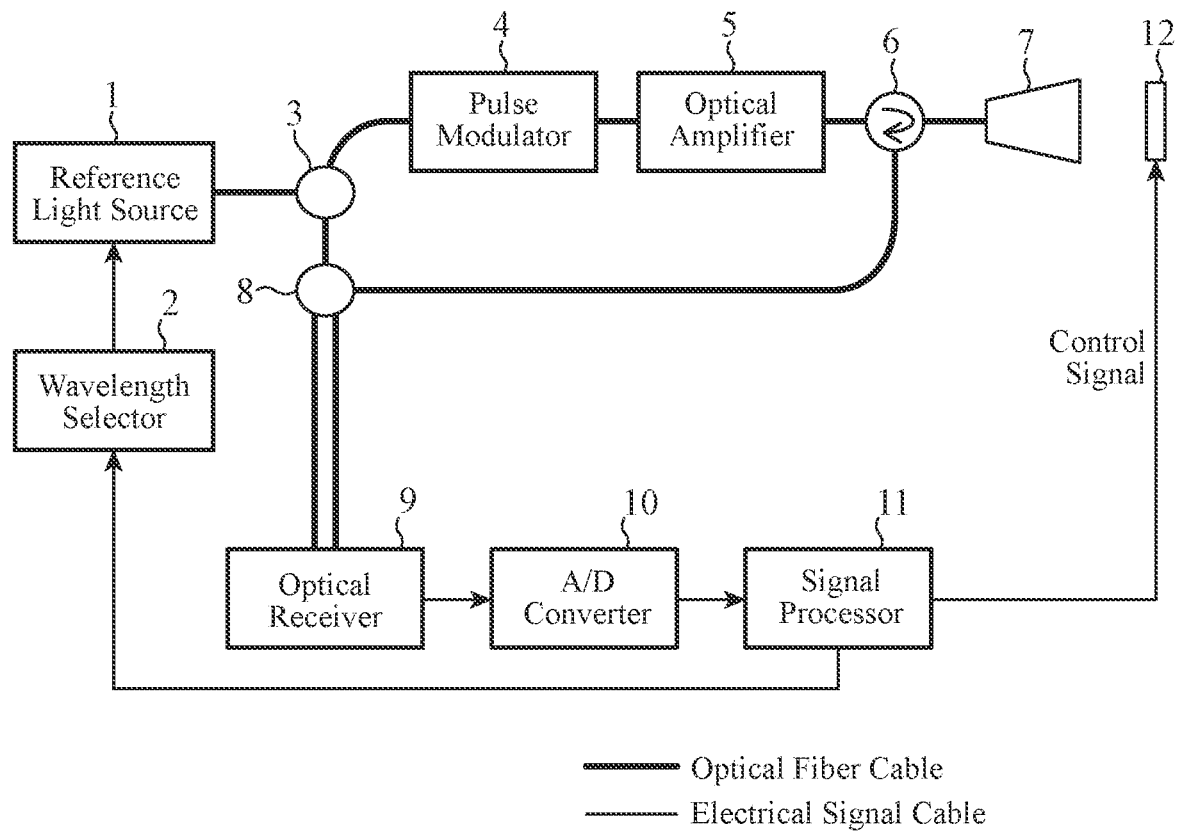
FIG. 14 is a configuration diagram illustrating a laser radar device according to Embodiment 4 of the present disclosure.

FIG. 14 is a configuration diagram illustrating a laser radar device according to Embodiment 4 of the present disclosure. In FIG. 14, the same reference signs as those in FIG. 1 represent the same or corresponding parts, so that the description thereof is omitted.

A direction selector 12 provided with, for example, a mirror and the like is a switching unit which switches a direction in which laser light is emitted from an optical antenna 7 in accordance with a control signal output from a signal processor 11.

Figure 15:
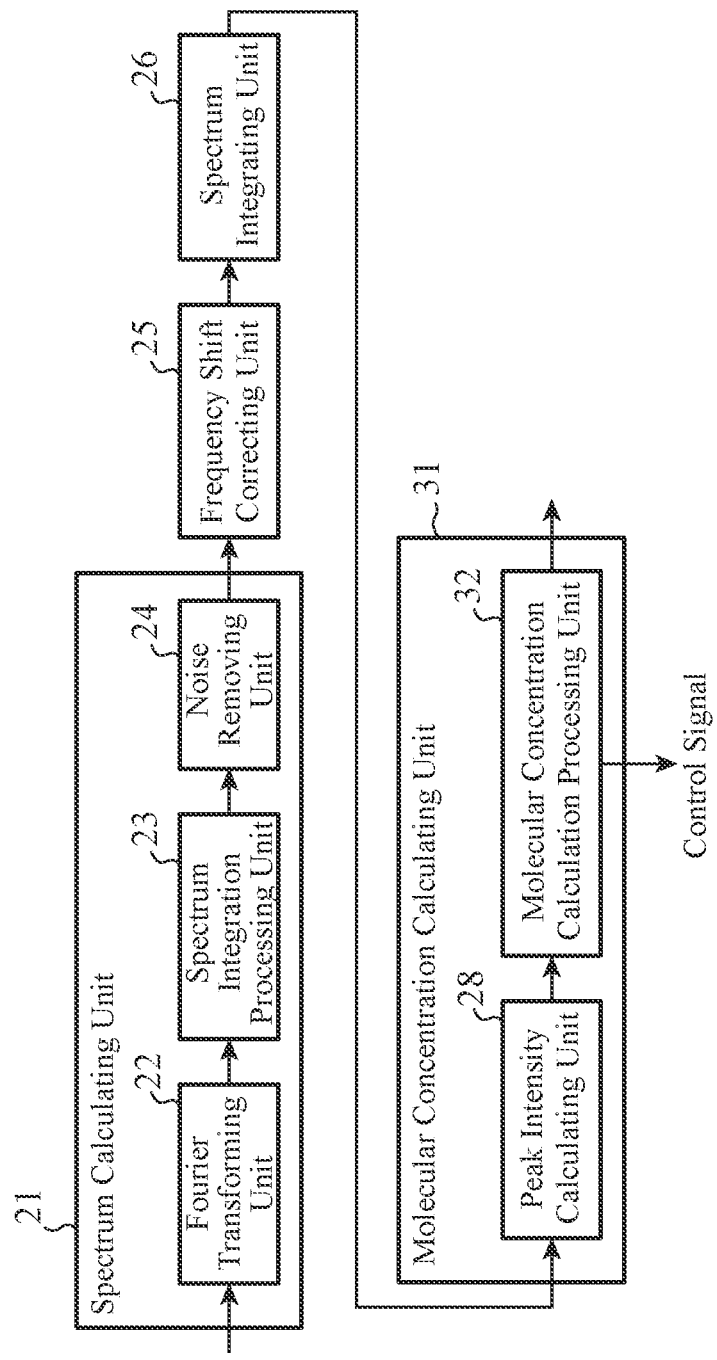
FIG. 15 is a configuration diagram illustrating a signal processor 11 of the laser radar device according to Embodiment 4 of the present disclosure.

FIG. 15 is a configuration diagram illustrating the signal processor 11 of the laser radar device according to Embodiment 4 of the present disclosure. In FIG. 15, the same reference signs as those in FIG. 2 represent the same or corresponding parts, so that the description thereof is omitted.

A molecular concentration calculating unit 31 is provided with a peak intensity calculating unit 28 and a molecular concentration calculation processing unit 32.

The molecular concentration calculating unit 31 performs a process of calculating a concentration C of the molecules in the atmosphere from a first signal spectrum $SP_1$ integrated by a spectrum integrating unit 26 and a second signal spectrum $SP_2$ integrated by the spectrum integrating unit 26 as is the case with the molecular concentration calculating unit 27 in FIG. 2.

Unlike the molecular concentration calculating unit 27 in FIG. 2, the molecular concentration calculating unit 31 outputs the control signal indicating that the direction in which the laser light is emitted from the optical antenna 7 is switched to the direction selector 12, and calculates the concentration C of the molecules in the atmosphere each time the direction selector 12 switches the direction in which the laser light is emitted, thereby performing a process of obtaining the distribution of the molecular concentrations C.

The molecular concentration calculation processing unit 32 is implemented by, for example, a molecular concentration calculating circuit 47 illustrated in FIG. 3 as is the case with the molecular concentration calculation processing unit 29 in FIG. 2.

The molecular concentration calculation processing unit 32 performs a process of calculating the concentration C of the molecules in the atmosphere from a first peak intensity $P_{on}$ calculated by the peak intensity calculating unit 28 and a second peak intensity $P_{off}$ calculated by the peak intensity calculating unit 28 as is the case with the molecular concentration calculation processing unit 29 in FIG. 2.

Unlike the molecular concentration calculation processing unit 29 in FIG. 2, the molecular concentration calculation processing unit 32 outputs the control signal indicating that the direction in which the laser light is emitted from the optical antenna 7 is switched to the direction selector 12.

The molecular concentration calculation processing unit 32 also performs a process of obtaining the distribution of the molecular concentrations C by calculating the concentration C of the molecules in the atmosphere each time the direction in which the laser light is emitted is switched by the direction selector 12.

Operations are next described.

Since the operations other than that of the direction selector 12 and the molecular concentration calculation processing unit 32 are similar to that in the above-described Embodiment 1, only the operations of the direction selector 12 and the molecular concentration calculation processing unit 32 are herein described.

The molecular concentration calculation processing unit 32 outputs the control signal indicating the direction in which the laser light is emitted from the optical antenna 7 to the direction selector 12.

The direction selector 12 sets the laser light emitted from the optical antenna 7 in the direction indicated by the control signal output from the molecular concentration calculation processing unit 32.

The molecular concentration calculation processing unit 32 calculates the concentration C of the molecules in the atmosphere from the first peak intensity $P_{on}$ calculated by the peak intensity calculating unit 28 and the second peak intensity $P_{off}$ calculated by the peak intensity calculating unit 28 as is the case with the molecular concentration calculation processing unit 29 in FIG. 2.

When calculating the concentration C of the molecules in the atmosphere, the molecular concentration calculation processing unit 32 outputs the control signal indicating that the direction in which the laser light is emitted from the optical antenna 7 is switched to the direction selector 12.

The direction selector 12 switches the direction in which the laser light is emitted from the optical antenna 7 in accordance with the control signal output from the molecular concentration calculation processing unit 32.

Since the above-described processes are repeatedly performed by the direction selector 12 and the molecular concentration calculation processing unit 32, the molecular concentration calculation processing unit 32 calculates the concentration C of the molecules corresponding to a plurality of emitting directions. In this manner, the distribution of the molecular concentrations C in the atmosphere is obtained.

Embodiment 5

Although it is described in Embodiments 1 to 4 that the reference light source 1 has the function of outputting the first laser light beam $Lb_1$ and the second laser light beam $Lb_2$, it is also possible to provide a reference light source 1a for outputting first laser light beam $Lb_1$ and a reference light source 1b for outputting second laser light beam $Lb_2$ separately.

Figure 16:
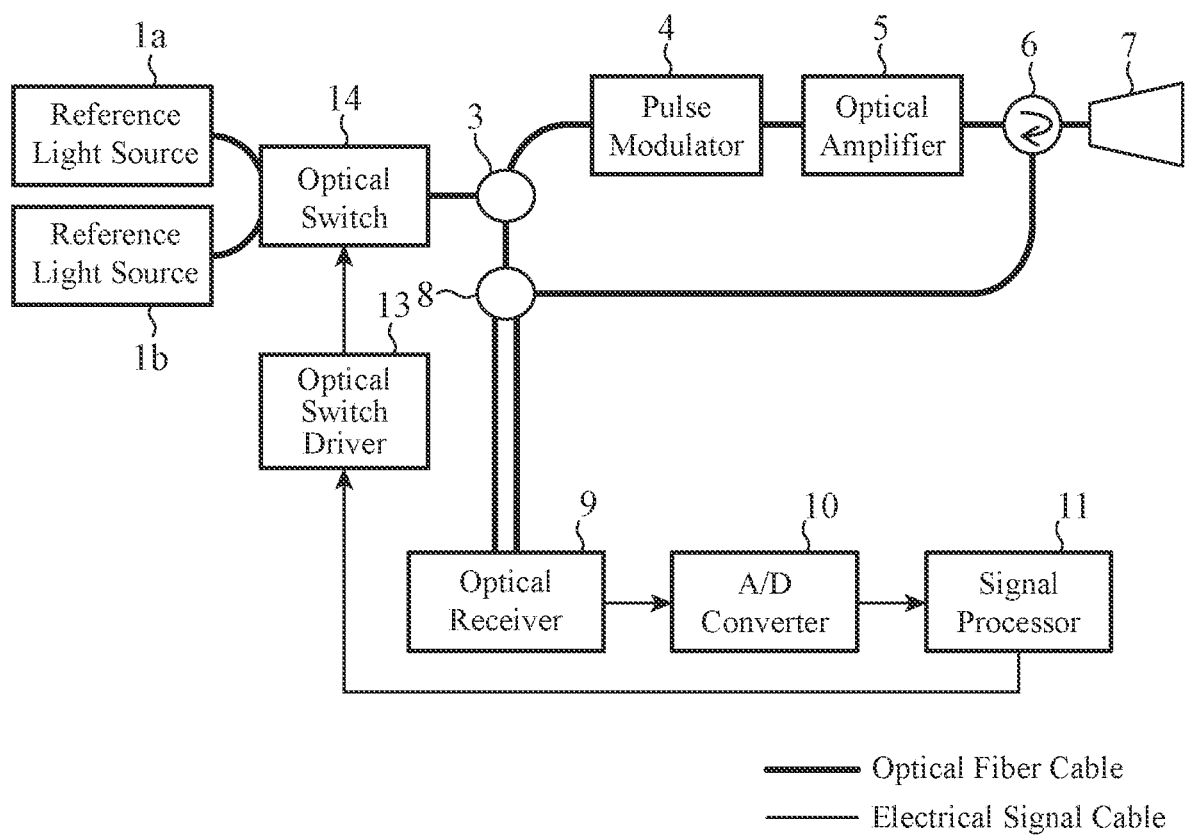
FIG. 16 is a configuration diagram illustrating a laser radar device according to Embodiment 5 of the present disclosure.

FIG. 16 is a configuration diagram illustrating a laser radar device according to Embodiment 5 of the present disclosure. In FIG. 16, the same reference signs as those in FIG. 1 represent the same or corresponding parts, so that the description thereof is omitted.

The reference light source 1a is a light source which outputs the first laser light beam $Lb_1$.

The reference light source 1b is a light source which outputs the second laser light beam $Lb_2$.

When receiving a wavelength selecting signal indicating that the first laser light beam $Lb_1$ is to be output from a wavelength selector 2, an optical switch driver 13 outputs a control signal indicating that the reference light source 1a and an optical distributor 3 are to be connected to each other to an optical switch 14.

Also, when receiving a wavelength selecting signal indicating that the second laser light beam $Lb_2$ is to be output from the wavelength selector 2, the optical switch driver 13 outputs a control signal indicating that the reference light source 1b and the optical distributor 3 are to be connected to each other to the optical switch 14.

When receiving the control signal indicating that the reference light source 1a and the optical distributor 3 are to be connected to each other from the optical switch driver 13, the optical switch 14 connects the reference light source 1a and the optical distributor 3.

Also, when receiving the control signal indicating that the reference light source 1b and the optical distributor 3 are to be connected to each other from the optical switch driver 13, the optical switch 14 connects the reference light source 1b and the optical distributor 3.

FIG. 16 illustrates an example in which the reference light sources 1a and 1b, the optical switch driver 13, and the optical switch 14 are used in the laser radar device in FIG. 1, but the reference light sources 1a and 1b, the optical switch driver 13, and the optical switch 14 may also be used in the laser radar device in FIG. 14.

Embodiment 5 is different from Embodiments 1 to 4 in that the reference light source 1a which outputs the first laser light beam $Lb_1$ and the reference light source 1b which outputs the second laser light beam $Lb_2$ are provided separately, and the optical switch driver 13 and the optical switch 14 are used to selectively emit the first laser light beam $Lb_1$ or the second laser light beam $Lb_2$ into the atmosphere.

In other points, this is similar to Embodiments 1 to 4, so that detailed description is omitted.

In Embodiment 5 also, as in Embodiment 1, there is an effect that it is possible to prevent deterioration in calculation accuracy of molecular concentration C even when a position of aerosol in the atmosphere changes.

Note that, embodiments may be freely combined, modifications to any components of the embodiments may be freely made, or omissions of any components may be made, within the scope of the invention.

INDUSTRIAL APPLICABILITY

One or more embodiments of the present disclosure are suitable for a laser radar device for calculating a concentration of molecules in the atmosphere.

REFERENCE SIGNS LIST 1, 1a, 1b Reference light source
2 Wavelength selector
3 Optical distributor
4 Pulse modulator
5 Optical amplifier
6 Optical circulator
7 Optical antenna
8 Optical coupler
9 Light receiver
10 A/D converter
11 Signal processing unit
12 Direction selector
13 Optical switch driver
14 Optical switch
21 Spectrum calculating unit
22 Fourier transforming unit
23 Spectrum integration processing unit
24 Noise removing unit
25, 30 Frequency shift correcting unit
26 Spectrum integrating unit
27, 31 Molecular concentration calculating unit
28 Peak intensity calculating unit
29, 32 Molecular concentration calculation processing unit
41 Fourier transforming circuit
42 Spectrum integrating circuit
43 Noise removing circuit
44 Frequency shift correcting circuit
45 Spectrum integrating circuit
46 Peak intensity calculating circuit
47 Molecular concentration calculating circuit
51 Memory
52 Processor

The invention claimed is:
1. A laser radar device comprising:
processing circuitry to
calculate, as signal spectra of a first combined light beam that is a combined light beam of first scattered light of a first laser light beam with a wavelength absorbed by a molecule in an atmosphere scattered by a scattering body in the atmosphere and the first laser light beam, a plurality of first signal spectra in a same time range, and calculate, as signal spectra of a second combined light beam that is a combined light beam of second scattered light of a second laser light beam with a wavelength not absorbed by the molecule scattered by the scattering body and the second laser light beam, a plurality of second signal spectra in the same time range;

correct a frequency shift of the plurality of first signal spectra with respect to a frequency of the first laser light beam and correct a frequency shift of the plurality of second signal spectra with respect to a frequency of the second laser light beam;

integrate the corrected plurality of first signal spectra and integrate the corrected plurality of second signal spectra; and calculate a concentration of molecules in the atmosphere from the integrated first and second signal spectra, wherein the processing circuitry is further configured to:
calculate a plurality of first signal spectra per time range for a first reception signal by performing Fourier transform on the first reception signal being a reception signal of the first combined light beam from an optical receiver for detecting the first combined light beam and the second combined light beam, and calculate a plurality of second signal spectra per time range for a second reception signal by performing Fourier transform on the second reception signal being a reception signal of the second combined light beam from the optical receiver; and integrate the calculated plurality of first signal spectra in a same time range and integrate the calculated plurality of second signal spectra in the same time range, correct a frequency shift of the integrated first signal spectrum with respect to the frequency of the first laser light beam and correct a frequency shift of the integrated second signal spectrum with respect to the frequency of the second laser light beam, wherein a plurality of combinations of frequencies for integrating signal components of a plurality of signal spectra is prepared, and the processing circuitry is further configured to integrate signal components of the frequencies indicated by each combination in the calculated plurality of first signal spectra within the same time range for each prepared combination of the frequencies and select any one signal spectrum out of the signal spectra after the integration corresponding to a plurality of combinations as the first signal spectrum after the integration, and integrate the signal components of the frequencies indicated by each combination in the calculated plurality of second signal spectra within the same time range for each prepared combination of the frequencies and select any one signal spectrum out of the signal spectra after the integration corresponding to a plurality of combinations as the second signal spectrum after the integration.

2. The laser radar device according to claim 1, wherein the processing circuitry is further configured to remove noise component included in the integrated first signal spectrum to output the first signal spectrum after noise component removal, and remove noise component included in the integrated second signal spectrum to output the second signal spectrum after noise component removal.

3. The laser radar device according to claim 1, wherein the processing circuitry is further configured to:
calculate a first peak intensity which is a peak intensity of the integrated first signal spectrum and calculate a second peak intensity which is a peak intensity of the integrated second signal spectrum; and calculate a concentration of the molecules in the atmosphere from the calculated first peak intensity and the calculated second peak intensity.

4. The laser radar device according to claim 3, wherein the processing circuitry is further configured to calculate a ratio between the calculated first peak intensity and the calculated second peak intensity, and calculate the concentration of the molecules in the atmosphere from the ratio between the first peak intensity and the second peak intensity.

5. The laser radar device according to claim 1, comprising:
a light source for outputting the first laser light beam and the second laser light beam;

an optical antenna for emitting the first laser light beam and the second laser light beam output from the light source into the atmosphere and receiving first scattered light and second scattered light being scattered light of the first and second laser light beams scattered by the scattering body;

an optical coupler for combining the first scattered light received by the optical antenna and the first laser light beam to output first combined light beam being combined light beam of the first scattered light and the first laser light beam, and combining the second scattered light received by the optical antenna and the second laser light beam to output second combined light beam being combined light beam of the second scattered light and the second laser light beam; and an optical receiver for detecting the first combined light beam output from the optical coupler to output the first combined light beam to the processing circuitry, and detecting the second combined light beam output from the optical coupler to output the second combined light beam to the processing circuitry.

6. The laser radar device according to claim 5, further comprising a direction selector for selecting a direction in which the first laser light beam and the second laser light beam are emitted from the optical antenna, wherein
the processing circuitry is further configured to obtain a distribution of molecular concentrations by calculating the concentration of the molecules in the atmosphere each time the direction selector selects the direction in which the first laser light beam and the second laser light beam are emitted.

7. A laser radar device comprising:
processing circuitry to
calculate, as signal spectra of a first combined light beam that is a combined light beam of first scattered light of a first laser light beam with a wavelength absorbed by a molecule in an atmosphere scattered by a scattering body in the atmosphere and the first laser light beam, a plurality of first signal spectra in a same time range, and calculate, as signal spectra of a second combined light beam that is a combined light beam of second scattered light of a second laser light beam with a wavelength not absorbed by the molecule scattered by the scattering body and the second laser light beam, a plurality of second signal spectra in the same time range;

correct a frequency shift of the plurality of first signal spectra with respect to a frequency of the first laser light beam and correct a frequency shift of the plurality of second signal spectra with respect to a frequency of the second laser light beam;

integrate the corrected plurality of first signal spectra and integrate the corrected plurality of second signal spectra; and calculate a concentration of molecules in the atmosphere from the integrated first and second signal spectra, wherein the processing circuitry is further configured to perform, before correcting the frequency shift of the first and second signal spectra, a correcting process of selecting any one frequency out of one or more frequencies having a signal component equal to or larger than a threshold in the first and second signal spectra, and treating a signal component of the selected frequency as a total sum of signal components of the one or more frequencies.

8. The laser radar device according to claim 7, wherein the processing circuitry is further configured to perform the correcting process by moving a signal component of the frequency not selected to the selected frequency, and then treat a signal component of the selected frequency as a total sum of signal components of the one or more frequencies.

9. The laser radar device according to claim 7, wherein the processing circuitry is further configured to:

calculate a first peak intensity which is a peak intensity of the integrated first signal spectrum calculate a second peak intensity which is a peak intensity of the integrated second signal spectrum; and calculate a concentration of the molecules in the atmosphere from the calculated first peak intensity and the calculated second peak intensity.

10. The laser radar device according to claim 9, wherein the processing circuitry is further configured to calculate a ratio between the calculated first peak intensity and the calculated second peak intensity, and calculate the concentration of the molecules in the atmosphere from the ratio between the first peak intensity and the second peak intensity.

11. The laser radar device according to claim 7, comprising:

a light source for outputting the first laser light beam and the second laser light beam;

an optical antenna for emitting the first laser light beam and the second laser light beam output from the light source into the atmosphere and receiving first scattered light and second scattered light being scattered light of the first and second laser light beams scattered by the scattering body;

an optical coupler for combining the first scattered light received by the optical antenna and the first laser light beam to output first combined light beam being combined light beam of the first scattered light and the first laser light beam, and combining the second scattered light received by the optical antenna and the second laser light beam to output second combined light beam being combined light beam of the second scattered light and the second laser light beam; and an optical receiver for detecting the first combined light beam output from the optical coupler to output the first combined light beam to the processing circuitry, and detecting the second combined light beam output from the optical coupler to output the second combined light beam to the processing circuitry.

12. The laser radar device according to claim 11, further comprising a direction selector for selecting a direction in which the first laser light beam and the second laser light beam are emitted from the optical antenna, wherein the processing circuitry is further configured to obtain a distribution of molecular concentrations by calculating the concentration of the molecules in the atmosphere each time the direction selector selects the direction in which the first laser light beam and the second laser light beam are emitted.

* * * * *